US 012159244 B2

(12) United States Patent
Ziemann

(10) Patent No.: US 12,159,244 B2
(45) Date of Patent: *Dec. 3, 2024

(54) SYSTEMS AND METHODS FOR CREATING A RICH SOCIAL MEDIA PROFILE

(71) Applicant: salesforce.com, inc., San Francisco, CA (US)

(72) Inventor: Tyler A. Ziemann, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,335

(22) Filed: Aug. 17, 2023

(65) Prior Publication Data

US 2024/0046163 A1 Feb. 8, 2024

Related U.S. Application Data

(63) Continuation of application No. 17/443,068, filed on Jul. 20, 2021, now Pat. No. 11,763,208, which is a (Continued)

(51) Int. Cl.
*G06Q 10/00* (2023.01)
*G06F 16/00* (2019.01)

(52) U.S. Cl.
CPC ............. *G06Q 10/00* (2013.01); *G06F 16/00* (2019.01)

(58) Field of Classification Search
CPC ................................ G06F 16/00; G06Q 10/00
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Huawen A Peng
(74) *Attorney, Agent, or Firm* — Weaver Austin Villeneuve & Sampson LLP

(57) ABSTRACT

Disclosed are systems, apparatus, methods and computer-readable media for updating information stored in a database system over a network. In some implementations, first contact data is retrieved from a first virtual portion of a database system, where the first contact data provides first contact information associated with at least one entity. In some instances, the first contact data is compared with second contact data, where the second contact data provides second contact information associated with the at least one entity. In some instances, at least some of the second contact information is retrieved from a social networking system. In various implementations, at least one difference between the first contact data and the second contact data is identified, where the at least one difference is capable of being presented in a user interface displayed at a computer system. In some instances, a selection identifying contact data to store is received.

20 Claims, 24 Drawing Sheets

Related U.S. Application Data continuation of application No. 15/920,711, filed on Mar. 14, 2018, now Pat. No. 11,093,866, which is a continuation of application No. 13/445,648, filed on Apr. 12, 2012, now Pat. No. 9,953,273.

(60) Provisional application No. 61/502,041, filed on Jun. 28, 2011.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,073,138 A * | 6/2000 | de l'Etraz et al. . G06Q 30/0601 707/999.102 |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B2 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,853,622 B1 | 12/2010 | Baluja et al. |
| 7,853,881 B1 | 12/2010 | Aly et al. |
| 7,860,760 B2 * | 12/2010 | Smith ................ H01R 13/7175 705/26.81 |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,280,913 B2 | 10/2012 | Bergin |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,566,328 B2 | 10/2013 | Tseng et al. |
| 8,646,103 B2 | 2/2014 | Jakobson et al. |
| 8,656,273 B1 * | 2/2014 | Tifford .................... G06Q 30/02 715/224 |
| 9,053,149 B2 * | 6/2015 | Ebenstein ........... G06F 16/9038 |
| 9,064,339 B2 | 6/2015 | Ziemann |
| 9,953,273 B2 | 4/2018 | Ziemann |
| 11,093,866 B2 | 8/2021 | Ziemann |
| 11,763,208 B2 | 9/2023 | Ziemann |
| 2001/0044791 A1 | 11/2001 | Richter et al. |
| 2002/0049828 A1 | 4/2002 | Pekarek-Kostka |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |

(56) References Cited

U.S. PATENT DOCUMENTS

| | | |
|---|---|---|
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0182310 A1 | 9/2003 | Charnock et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0182745 A1 | 8/2005 | Dhillon et al. |
| 2006/0155750 A1 | 7/2006 | Fowler et al. |
| 2006/0229958 A1 | 10/2006 | Sergio et al. |
| 2007/0100906 A1 | 5/2007 | Cheng et al. |
| 2008/0005064 A1 | 1/2008 | Sarukkai |
| 2008/0086343 A1 | 4/2008 | Pendergraft et al. |
| 2008/0103949 A1 | 5/2008 | Lobana et al. |
| 2008/0235242 A1* | 9/2008 | Swanburg ......... H04M 3/53333 |
| 2008/0249972 A1 | 10/2008 | Dillon |
| 2008/0301142 A1 | 12/2008 | Marolf |
| 2009/0005021 A1 | 1/2009 | Forstall et al. |
| 2009/0005981 A1 | 1/2009 | Forstall et al. |
| 2009/0063415 A1 | 3/2009 | Chatfield et al. |
| 2009/0100342 A1 | 4/2009 | Jakobson |
| 2009/0132345 A1 | 5/2009 | Meyssami et al. |
| 2009/0143052 A1 | 6/2009 | Bates et al. |
| 2009/0171691 A1 | 7/2009 | Lubarski et al. |
| 2009/0177744 A1 | 7/2009 | Marlow et al. |
| 2009/0204408 A1 | 8/2009 | Simpson et al. |
| 2009/0222298 A1 | 9/2009 | Atmaja |
| 2009/0254971 A1* | 10/2009 | Herz ....................... G06Q 10/10 726/1 |
| 2010/0088636 A1 | 4/2010 | Yerkes et al. |
| 2010/0153241 A1 | 6/2010 | Rucker et al. |
| 2010/0184416 A1 | 7/2010 | Gupta et al. |
| 2010/0281364 A1 | 11/2010 | Sidman |
| 2011/0055234 A1 | 3/2011 | Miettinen |
| 2011/0145636 A1 | 6/2011 | Schauser et al. |
| 2011/0167058 A1 | 7/2011 | Van Os |
| 2011/0218958 A1 | 9/2011 | Warshavsky et al. |
| 2011/0247051 A1 | 10/2011 | Bulumulla et al. |
| 2011/0295725 A1 | 12/2011 | Gee et al. |
| 2011/0302630 A1 | 12/2011 | Nair et al. |
| 2011/0307455 A1 | 12/2011 | Gupta et al. |
| 2012/0042218 A1 | 2/2012 | Cinarkaya et al. |
| 2012/0046992 A1 | 2/2012 | Hu et al. |
| 2012/0158744 A1* | 6/2012 | Tseng ................ G06F 16/24578 707/E17.084 |
| 2012/0233137 A1 | 9/2012 | Jakobson et al. |
| 2012/0290407 A1 | 11/2012 | Hubbard et al. |
| 2012/0303652 A1* | 11/2012 | Tseng .................... G06F 16/275 709/204 |
| 2013/0002676 A1 | 1/2013 | Ziemann |
| 2013/0007029 A1 | 1/2013 | Ziemann |
| 2013/0007049 A1 | 1/2013 | Ziemann |
| 2013/0007126 A1 | 1/2013 | Ziemann |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0032493 A1 | 1/2014 | Wang |
| 2014/0201190 A1* | 7/2014 | Ebenstein ............. G06F 16/248 707/722 |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2018/0204143 A1 | 7/2018 | Ziemann |
| 2022/0004936 A1 | 1/2022 | Ziemann |

OTHER PUBLICATIONS

Kajeepeta, Sreedhar (Apr. 12, 2010) "Multi-tenancy in the cloud: Why it matters," COMPUTERWORLD, 5 pp.

U.S. Non-Final office Action dated Sep. 30, 2022 in U.S. Appl. No. 17/443,068.

U.S. Advisory Action dated Nov. 5, 13 issued in U.S. Appl. No. 13/445,653.

U.S Advisory Action dated Aug. 5, 2015 in U.S. Appl. No. 13/445,648.

U.S Advisory Action dated Sep. 16, 2015 in U.S. Appl. No. 13/445,662.

U.S Advisory Action dated Sep. 22, 2014 in U.S. Appl. No. 13/445,666.

U.S. Appl. No. U.S. Appl. No. 13/986,251.

U.S. Appl. No. U.S. Appl. No. 13/986,744, inventors Jakobson et al., filed on May 31, 2013.

U.S. Appl. No. U.S. Appl. No. 15/920,711, inventors Ziemann et al., filed on Mar. 14, 2018.

U.S. Final Office Action dated Feb. 24, 2016 issued in U.S. Appl. No. 13/445,653.

U.S. Final Office Action dated May 4, 2016 issued in U.S. Appl. No. 13/445,662.

U.S. Final Office Action dated Jun. 4, 2015 issued in U.S. Appl. No. 13/445,648.

U.S. Final Office Action dated Jul. 15, 2014 issued in U.S. Appl. No. 13/445,666.

U.S. Final Office Action dated Jul. 18, 2013 issued in U.S. Appl. No. 13/445,653.

U.S. Final Office Action dated Jul. 8, 2015 issued in U.S. Appl. No. 13/445,662.

U.S. Final Office Action dated Aug. 12, 2014 issued in U.S. Appl. No. 13/445,653.

U.S. Final Office Action dated Aug. 22, 2013 issued in U.S. Appl. No. 13/445,666.

U.S. Final Office Action dated Sep. 11, 2013 issued in U.S. Appl. No. 13/445,648.

U.S. Final Office Action dated Apr. 19, 2023 in U.S. Appl. No. 17/443,068.

U.S. Notice of Allowance dated Jan. 2, 2018 issued in U.S. Appl. No. 13/445,648.

U.S. Notice of Allowance dated Mar. 27, 2015 issued in U.S. Appl. No. 13/445,666.

U.S. Notice of Allowance dated Apr. 19, 2021 issued in U.S. Appl. No. 15/920,711.

U.S. Notice of Allowance dated May 19, 2023 in U.S. Appl. No. 17/443,068.

U.S. Office Action dated Oct. 22, 2020 issued in U.S. Appl. No. 15/920,711.

U.S. Office Action dated Oct. 31, 2014 issued in U.S. Appl. No. 13/445,666.

(56) References Cited

OTHER PUBLICATIONS

U.S. Office Action dated Nov. 25, 2015 issued in U.S. Appl. No. 13/445,662.
U.S. Office Action dated Nov. 7, 2014 issued in U.S. Appl. No. 13/445,648.
U.S. Office Action dated Jan. 23, 2013 issued in U.S. Appl. No. 13/445,653.
U.S. Office Action dated Dec. 7, 2012 issued in U.S. Appl. No. 13/445,648.
U.S. Office Action dated Feb. 11, 2014 issued in U.S. Appl. No. 13/445,653.
U.S. Office Action dated Feb. 11, 2014 issued in U.S. Appl. No. 13/445,666.
U.S. Office Action dated Mar. 20, 2015 issued in U.S. Appl. No. 13/445,662.
U.S. Office Action dated Apr. 10, 2013 issued in U.S. Appl. No. 13/445,666.
U.S. Office Action dated May 16, 2017 issued in U.S. Appl. No. 13/445,648.
U.S. Office Action dated Jun. 18, 2015 issued in U.S. Appl. No. 13/445,653.
U.S. Office Action dated Sep. 15, 2016 issued in U.S. Appl. No. 13/445,648.

* cited by examiner

SYSTEMS AND METHODS FOR CREATING A RICH SOCIAL MEDIA PROFILE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present application relates generally to providing on-demand services in a network using a database system and, more specifically, to techniques for updating information stored in the database system over the network.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process operations for the disclosed inventive systems, apparatus, and methods for unifying contact data from an online social network. These drawings in no way limit any changes in form and detail that may be made by one skilled in the art without departing from the spirit and scope of the disclosed implementations.

FIG. 6 illustrates an example of an image 600 of a user interface displaying identified shared contact data that is filtered by department in accordance with some implementations of method 200.

FIG. 7 illustrates an example of an image 700 of a user interface that presents the identified shared contact data after applying one or more filters in accordance with some implementations of method 200.

FIG. 10 illustrates an example of an image 1000 of a user interface that may be used to store search parameters in accordance with some implementations of method 200.

FIG. 16 illustrates an example of an image 1600 of a user interface that may be used to present a user with information that identifies which of the user's social networks the database service provider has access to and does not have access to.

FIG. 20 illustrates an example of an image 2000 of a user interface that may be used to receive a selection of contact data from the user.

DETAILED DESCRIPTION

Figure 1:
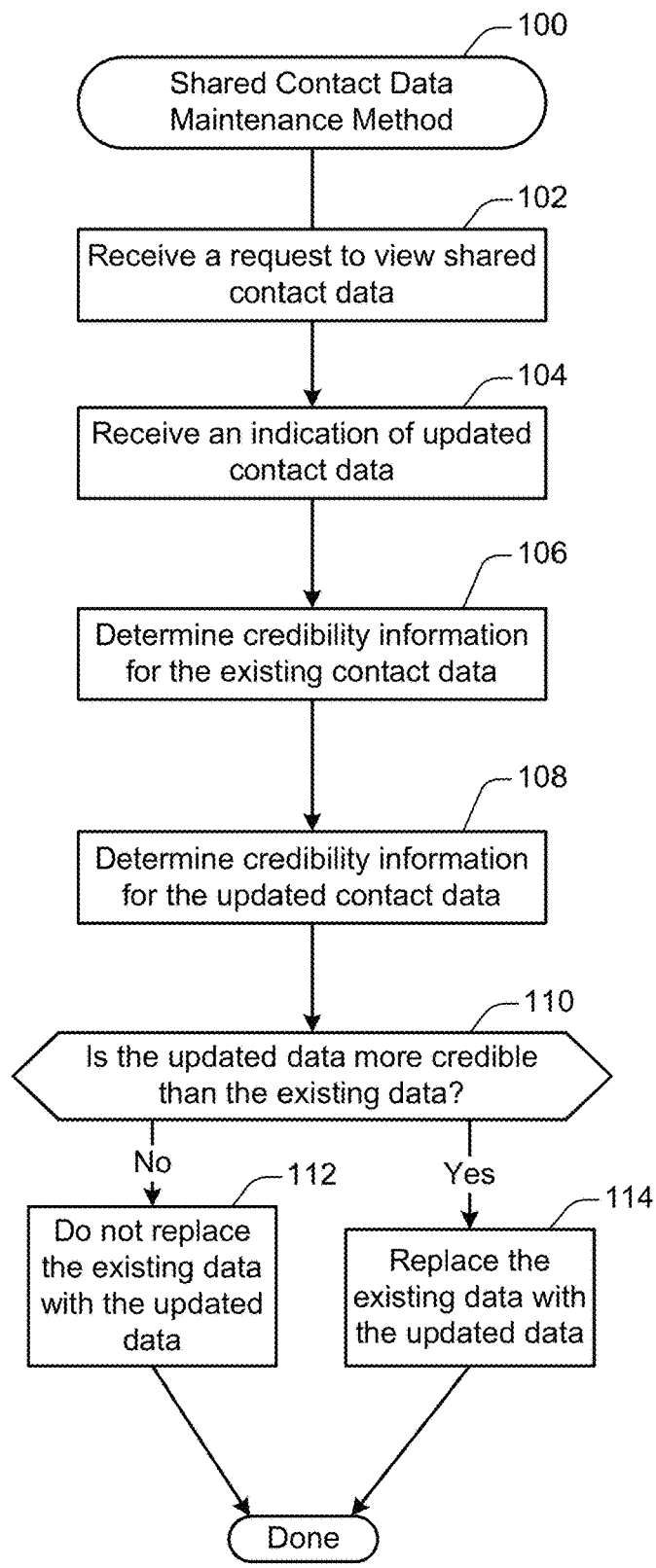
FIG. 1 shows a flowchart of an example of a shared contact data maintenance method 100, performed in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, well known process/method steps have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Conventional methods of storing contact information do not provide as much contact information for a particular contact as may be available. "Contact information" may refer to information that identifies particular traits or distinguishing characteristics associated with an entity, particularly information for how one can identify and reach, i.e., contact that entity. The entity may be a business entity, such as a company, or an individual such as an employee of a company. By way of example, contact information associated with the business entity may identify a phone number or business address that may be used to contact the business entity. While conventional methods of storing contact information may allow a user to manually input and store contact information, they do not provide the user with access to additional sources of contact information that may be used to enrich the potentially limited amount of contact information known to the user.

In one conventional scenario, a user may create a list of contacts and may store various contact information associated with each contact included in the list. The contacts may be stored locally on a computing device, or on a server. While the user may be provided access to the user's own contact information stored either locally or remotely, if the user wishes to supplement the user's contact information, the user must find a way to locate the additional contact information and update the user's contact information by inputting the additional contact information manually. Thus, the user may have to locate and access a web site associated with a business, copy a piece of contact information associated with the business, such as a phone number, and then input the phone number into the user's own contact data.

The disclosed implementations provide a user with the ability to access shared contact information stored in a shared database to which multiple entities contribute contact information. Thus, shared contact information stored in the shared database may be "crowd sourced." The disclosed implementations may further allow the user to retrieve contact information from the shared database. Because multiple entities contribute information to the shared database, the shared contact information stored in the shared database may provide a centralized repository of shared contact information that has far more contact information associated with a particular contact than the user's own contact data. In some implementations, the user may be provided with access to the shared contact information as part of a database service the user has subscribed to.

In one example, the user may store contact information in a virtual portion of a multi-tenant database system operated and maintained by an on-demand database service provider. The virtual portion of the database system may be a portion of the database system that is provided by the database service provider as part of a service the user subscribes to, and that is accessible only by the user and not by other users of the database system. In various implementations, a virtual portion of the on-demand service environment is called an "organization" (also referred to herein as an "org."). Thus, in some implementations, a user may subscribe to a service provided by a database service provider. The database service provider may provide the user with an org in response to the user successfully subscribing to a particular service. Thus, the org may provide the user with a portion of the database service provider's database system that functions as a "sand box" capable of implementing any database service that the user has subscribed to and is permitted access to.

Accordingly, when the user logs in to the user's virtual portion of the database system, the user may access and view the user's contact information. The user may be provided with an indication that additional contact information is available. The additional contact information may be obtained from the shared database. Thus, the user may choose to import the additional contact information into the user's contact information from the shared contact information. In response to receiving the user's selection, the database service provider may import the relevant additional contact information into the user's contact information automatically.

The disclosed implementations further provide a user with the ability to access social networks associated with the user, and to retrieve contact information from the accessed social networks in order to supplement the user's own contact information. Thus, contact information from the user's social network accounts or profiles may be retrieved and included in the user's contact data stored in the database system. Moreover, this may be accomplished in conjunction with retrieval of contact information from the shared database. Thus, the user's contact information may be unified with "crowd sourced" contact information from the shared database and contact information from social networks associated with the user in order to create an enriched and unified set of contact information that may be stored as the user's own contact information.

In one example, the user may, as previously discussed, store contact information in a virtual portion of a multi-tenant database system operated and maintained by an on-demand database service provider. The user may grant the database service provider permission to access social network accounts associated with the user. The database service provider may retrieve contact information from the social networks associated with the user. The database service provider may also retrieve shared contact information from the shared database. For a particular contact, the database service provider may present the user's contact information, the shared contact information, and the contact information retrieved from social networks to the user at a user interface. The user may determine which of the presented contact information should be stored in the user's contact information, and which of the presented contact information should be discarded. Thus, the user may choose to include contact information from the shared database and contact information retrieved from the user's social network accounts to created unified contact information that the user may store as the user's own contact information.

These and other embodiments may be implemented by various types of hardware, software, firmware, etc. For example, some embodiments may be implemented, at least in part, by machine-readable media that include program instructions, state information, etc., for performing various services and operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM"). These and other features and benefits of the disclosed embodiments will be described in more detail below with reference to the associated drawings.

FIG. 1 shows a flowchart of an example of a shared contact data maintenance method 100, performed in accordance with some implementations. In various implementations, the method 100 may be used to receive an indication of updated contact data, determine credibility information associated with the updated contact data, and update the shared contact data when the updated contact data is more credible then the existing contact data.

In FIG. 1, at block 102, a request to view shared contact data may be received. In various implementations, a request may be received when a user of an on-demand database service provided by a database service provider wishes to view or contribute to shared contact data.

In various implementations, the contact data may describe a particular industry or business associated with the entity. For example, if the entity associated with the contact data is an employee of a company or corporation, the contact data may include the employee's name, occupational title, role within the organization that employs the individual, the employee's email address, mailing address, the employee's phone number, fax number, and an account name associated with the employee. The contact data may also include various other social network data associated with the employee, such as a list of which social networks the employee belongs to, and which "handles", user ID's, or other identifiers may be associated with the employee within each respective social network.

If the entity associated with the contact data is a company or corporation, the contact data may include information such as the company's name, phone number, email address, website url, billing address, and shipping address. The contact data may also include additional information associated with the company, such as the total worth of the company, the annual revenue earned by the company, primary place of business, the number of employees employed by the company, Dun & Bradstreet (D-U-N-S) number, Standard Industry Classification (SIC) number, and North American Industry Classification System (NAICS) number.

In various implementations, the contact data may comprise contact data items. Thus, contact data may refer to all available contact information associated with an entity, such as all biographical information associated with a sales representative. A contact data item may refer to a specific data object storing a piece of information associated with the entity, such as a phone number associated with the sales representative.

In various implementations, the contact data may be stored in one or more records. A record may generally refer to a data entity, such as an instance of a data object created by a user of the database service, for example, about a particular entity with which contact data is associated. The data object can have a data structure defined by a database service (a standard object) or defined by a subscriber (custom object). In one embodiment implementing a multi-tenant database, all of the records for the tenants have an identifier stored in a common table. In various implementations, there may be several types of records, each of which is associated with a particular entity. For example, a "Contact" record may store information with a contact, such as biographical information, while a "Lead" record may store information associated with a lead, such as information regarding a prospect or potential business opportunity. Furthermore, an "Account" record may store information associated with an account belonging to a user's business. The account may be, for example, a customer, a competitor, or a partner.

In various implementations, a record has data fields that are defined by the structure of the object (e.g. fields of certain data types and purposes). A record can also have custom fields defined by a user. A field can be another record or include links thereto, thereby providing a parent-child relationship between the records. Thus, according to various implementations, contact data associated with an entity, such as a contact, may be stored in various data fields included in a record. Each of the fields may store a contact data item associated with an entity, such as a contact.

In various implementations, the contact data may be shared contact data. Shared contact data may be contact data that is stored in an on-demand database service environment such that access to the data is shared by users of the database services provided by the database service provider. Thus, the shared contact data may be contributed to and accessible by a plurality of entities associated with the database service, such as users of the database service. Thus, a first entity, such as a contact, may have associated shared contact data stored in a database system. The shared contact data may include a plurality of shared contact data items representing contact information associated with the first entity, such as a business address or occupational title. In various implementations, a second and third entity may be able to access the shared contact data and shared contact data items. The second and third entity may be users of the database service provided by the on-demand service provider. Moreover, in various implementations, the second and third entities may be able to edit the shared contact data items or contribute additional information to the records storing the shared contact data items. Thus, according to various implementations multiple entities may access or contribute information to shared contact data associated with a single entity. Accordingly, the shared contact data may include contact data aggregated from several entities. In various implementations, the entities may be users that subscribe to a service provided by the database service provider.

In various implementations, the shared contact data may be stored in a virtual portion of the database service environment. The virtual portion may represent a partition of a database system. In some implementations, the database system may be a multi-tenant database system. A plurality of settings may define the virtual portion of the database system. The plurality of settings may identify which entities have read and write access to the records stored in the virtual portion of the database system. Thus, the plurality of settings associated with the virtual portion of the database may identify what entities have read and write access to the shared contact data stored within the virtual portion of the database system. In various embodiments, the plurality of settings may be set and controlled by the database service provider. Accordingly, the database service provider may control which entities have read and write access to the records storing the shared contact data.

Returning to FIG. 1, step 102, in various implementations, the request to view the shared contact data may be received from an entity, such as a user of the database service. For example, the request may be in the form of a query issued to a virtual portion of a multi-tenant database used to store the shared contact data. Thus, a user of a database service may query a database system, or more specifically, the virtual portion of the database system storing the shared contact data to view various shared contact data items stored therein. The request may be received and handled by the database service provider which operates and maintains the database system.

In FIG. 1, at block 104, an indication of updated contact data may be received. According to some implementations, updated contact data may refer to contact data including new or updated contact information associated with existing shared contact data. Thus, the updated contact data may include additional or new contact data items associated with an existing record already stored in the shared contact data.

The indication of updated contact data may be a message issued to the database service provider from a user of the database service. In various implementations, the indication of updated contact data may indicate that the user has provided updated contact data to be included into the shared contact data. Thus, in various implementations, if a user of the database system attempts to contribute contact information to the shared contact data, an indication of updated contact data may be issued to the database service provider.

In various implementations, the user may provide updated contact data in response to being presented with existing shared contact data. For example, a user may be presented with existing shared contact data associated with a sales representative at an organization. The shared contact data may include the occupational title of the sales representative. The occupational title may be "sales manager." The user may have learned from a previous interaction with the sales representative that the sales representative has a new occupational title that is not currently reflected in the shared contact data. The new occupational title may be "regional sales manager." The user may then provide the new occupational title to the database service provider as updated contact data. As discussed in greater detail below with regard to block 110, the database service provider may determine whether or not the new occupational title should be included in the shared contact data associated with the sales representative.

Thus, according to various implementations, the database service provider may store shared contact data associated with a contact in a virtual portion of a database, and may receive updated contact data associated with the contact from at least one user of the database system. The database service provider may then assess the credibility of the existing shared contact data already stored in the database system and the credibility of the updated contact data to determine which contact data is more credible, and should be stored for future use.

Accordingly, in FIG. 1, at block 106, credibility information for the existing shared contact data may be determined. Credibility information may provide information about how likely contact data associated with a contact, such as an organization or an individual, is true or valid. For example, credibility information may provide an indication of whether or not a phone number associated with a contact is a valid phone number or not. Thus, credibility information may be used to determine whether or not contact information is credible, and whether or not contact information should be included in the shared contact data.

In various implementations, the credibility information may be determined based on characteristics of the contact data. Such characteristics may include how recently the contact information was obtained, how many users have contributed the same or similar contact information, and whether the contact information is the proper type of information for a particular type of the shared contact data item. For example, a phone number submitted as a contact's name would not be a proper type of information for that particular type of the shared contact data item, and would not be deemed credible.

In various implementations, the credibility information associated with the existing shared contact data may be determined by the database service provider. For example, the database service provider may use characteristics of the contact information to infer how credible the contact information is. In one example, a phone number associated with an employee of an organization may be stored in a data field of a record storing shared contact data associated with the employee. The phone number may be stored in a data field identified as the employee's direct line. However, the phone number may actually be a general contact number associated with the employee's organization. The database service provider may infer that the phone number is not the employee's direct phone line based on characteristics of the phone number. For example, if the last three digits of the phone number are zeros, the phone number is not likely to be a direct phone line, and instead more likely to be the general contact number for the employee's organization. Based on this determination, the database service provider may determine that the phone number is not credible.

In some implementations, the credibility information may be determined based on characteristics of the source of the contact data. The source of the contact data may refer to the source of the indication of updated contact data. For example, the source may be a user of the database service attempting to contribute updated contact data to the shared contact data. Characteristics of the source of the contact data may include the reliability of the contributor, the response rate of the contributor, the social influence of the contributor, the seniority of the contributor at his or her particular organization, and previous credibility determinations associated with the contributor.

In various implementations, the credibility information associated with the existing shared contact data may be stored within the same record as the existing shared contact data. In some implementations, the credibility information associated with the existing shared contact data may be stored in a separate record than the existing shared contact data. For example, credibility information, such as how recently a contact data item was contributed, may be stored in a record separate from the contact data associated with the credibility information.

In FIG. 1, at block 108, credibility information for the updated contact data may be determined. The credibility information for the updated contact data may provide information indicative of the credibility of the updated contact data. Similar to the credibility information discussed above at step 106 and with respect to the existing contact data, credibility information associated with the updated contact data may be inferred from contact data itself, or from the source of the contact data. The credibility information associated with the updated contact data may be stored in the same record or a different record as the updated contact data.

As discussed above with respect to block 106, the credibility information for the updated contact data may be determined based on the data obtained from a user of a database service provided by the database service provider. The credibility information may then be stored by the database service provider.

In FIG. 1, at block 110, it may be determined whether the updated contact data or the existing shared contact data is more credible. In various implementations, the database service provider may determine which contact data is more credible based on a comparison between the credibility information associated with the existing shared contact data and the credibility information associated with updated contact data.

In various implementations, the determination of which contact data is more credible may be made in accordance with several criteria. Thus, the criteria may specify a set of rules used to make the determination. For example, the criteria for making a credibility determination may specify that recent contact information is more credible than older contact information. In this instance, the database service provider may compare a value stored in a data field used to store credibility data associated with the more recent contact data with a value stored in a data field used to store credibility data associated with the older contact data. The credibility data may, for example, identify when contact data associated with the credibility data was contributed. Upon comparing the different values, the database service provider may use the established criteria for making the credibility determination in order to determine that the more recent contact data is more credible than the older contact data.

In various implementations, the criteria used to make a credibility determination may be specified by the database service provider. Thus, the database service provider may determine the criteria and rules used as the basis of the credibility determination. For example, the database service provider may determine that a credibility determination may be made based on a position within a hierarchy of an organization. For example, the database service provider may specify that contact information provided by a manager of a company is more credible than contact information received from an employee subordinate to the manager because the manager has a higher position in the organization's hierarchy. In this instance, if both the manager and the employee submitted conflicting contact data, the contact information submitted by the manager would be determined to be more credible based on his higher position within the hierarchy of the organization. It will be appreciated that various other criteria may be used for various characteristics associated with the contact information itself, and the contributor of the contact information.

In some implementations, the criterion used to make the determination may be stored in a database as a record. Thus, the record may include a plurality of data fields used to store the criteria that form the basis of the credibility determination. In various implementations, the record storing the criteria may be recalled at a later time during a subsequent determination. Thus, the stored criteria may be applied to multiple credibility determinations.

In various implementations, the database service provider may use the above-referenced criteria to determine whether the updated contact data or the existing shared contact data is more credible. Thus, the database service provider may compare credibility information associated with the updated contact data with credibility information associated with the existing shared contact data in accordance with various criteria specified by the database service provider.

If it is determined that the existing shared contact data is more credible than the updated contact data, in FIG. 1, at block 112, the existing shared contact data may be retained. As discussed above with respect to block 106, the existing shared contact data may be stored as a record in a multi-tenant database system. If the existing shared contact data is more credible than the updated contact data, the record storing the existing shared contact data remains unchanged, and the values stored within the record remain unchanged. Thus, according to various implementations, the existing shared contact data is retained, while the updated contact data may be discarded.

In various implementations, instead of being discarded, the updated contact data may be stored in a separate record. The separate record may be referred to in future credibility determinations if the information stored in the separate record is relevant. For example, if an address associated with an organization is submitted to the database service provider as updated contact data but determined to be less credible than the address already stored in the existing shared contact data, the submitted address may be stored in a separate record in the database service provider's database. If the discarded address is submitted again by a different user, the database service provider may query the database storing the separate records to determine how many times this address has been submitted. The database service provider may then factor that information into the credibility determination. For example, if that address has been submitted several times, it may be deemed more credible than if had only been submitted once.

If it is determined that the updated contact data is more credible than the existing shared contact data, in FIG. 1, at block 114, the existing shared contact data may be replaced by the updated contact data. Thus, the appropriate values of the data fields of the record storing the existing shared contact data may be overwritten with the values of the updated contact data. Returning to a previous example, an address associated with an organization may be submitted to the database service provider as updated contact data. If the address is deemed more credible than the address stored in the existing shared contact data, the existing shared contact data may be overwritten, thus updating the existing shared contact data with the new address of the organization.

Figure 2:
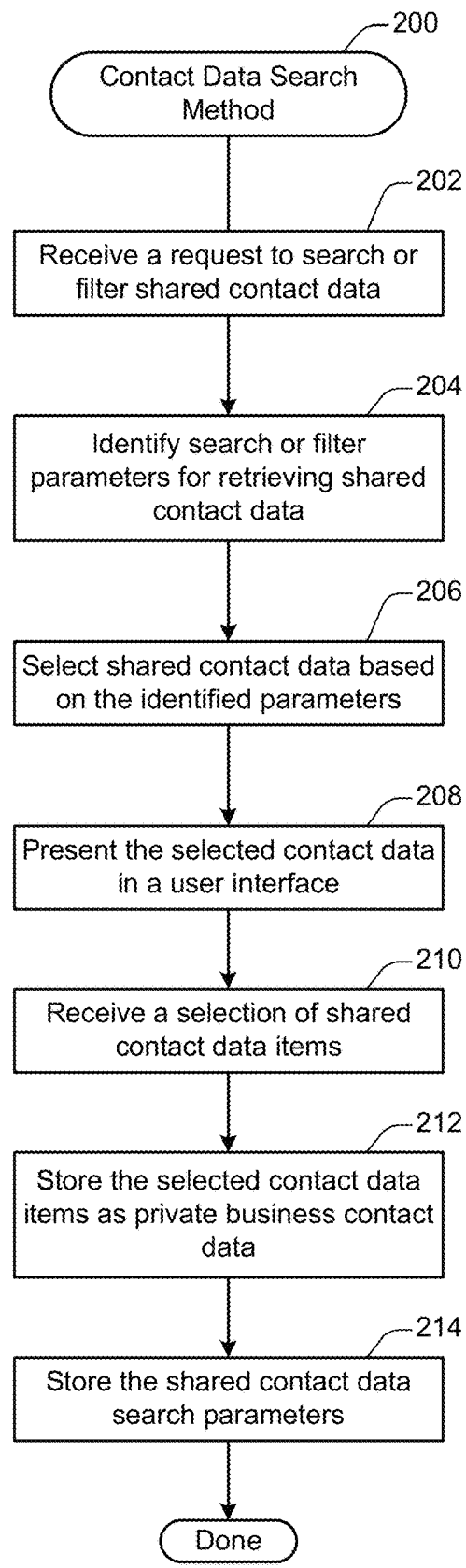
FIG. 2 shows a flowchart of an example of a contact data search method 200, performed in accordance with some implementations.

FIG. 2 shows a flowchart of an example of a contact data search method 200, performed in accordance with some implementations. In various implementations, method 200 may be used to receive a request to search or filter shared contact data, select shared contact data based on search or filter parameters, and store selected contact data as private contact data.

In FIG. 2, at block 202, a request to search or filter shared contact data may be received. A user may issue such a request to locate additional contact information. In various implementations, the user may have stored private contact data within the user's own virtual portion of the database system. Private contact data may be contact data that has been provided by the user and is only accessible by the user. For example, a user may log into a virtual portion of the database service environment that has been provided by the database service provider as part of a database service that the user subscribes to. This virtual portion may be a portion of the database service environment that is fully accessible by the user, but is not accessible by other entities using the database service environment. Thus, contact data stored in the user's virtual portion of the database is private contact data because other users of the database service do not have access to it.

The user may determine that additional contact information should be obtained. For example, the user may have stored contact data associated with a group of sales representatives in a sales division associated with a company. However, the private contact data may be missing specific contact data items, such as a fax number associated with one of the sales representatives. Moreover, there may be other sales representatives within that sales division for whom the user has no contact information. Thus, the user may issue a request to search the shared contact data for additional contact information that may provide additional information about contacts that already exist within the user's own private contact data, and additional contacts that don't already exist in the user's private contact data.

In some implementations, the user may issue the request through a user interface. The user interface may be provided by the database service provider to the user at a computer system. In various implementations, the computer system may be a personal computer, a mobile computing device, or a mobile telecommunications device. Thus, the user interface may be presented to a user through one of several computing platforms, such as a mobile platform or a personal computer.

In various implementations, the request may be a message that includes information, such as search or filter parameters specified by the user that forms the basis for searching and filtering the shared contact data. Thus, the specified information may be used to query a database storing shared contact data. In some implementations, the database may be operated and maintained by the database service provider, and the request to search or filter the shared business contact data may be received by the database service provider.

In FIG. 2, at block 204, search or filter parameters for retrieving shared contact data may be identified. The search or filter parameters may form the basis for searching or filtering shared contact data stored and maintained by the database service provider. Thus, the database service provider may use the search and filter parameters to identify shared contact data items and return the results of a search requested by the user.

In various implementations, a search parameter may be a parameter that identifies contact data items that are relevant to the user's request. In various implementations, the search parameter may be associated with a specific data field of shared contact data records used to store shared contact data. The search parameter may identify a value that may be stored in the associated data field. For example, the search parameter may identify a value representing a company name, an occupational title, a geographic location, an industry, or a sub-industry. In one example, the search parameter may be associated with an occupational title associated with a contact. The search parameter may identify a specific occupational title, such as "regional sales manager." Records storing shared contact data may each include a data field storing an occupational title associated with a contact. Thus, the identified search parameter, i.e. the occupational title, may correspond to a data field included in the shared contact data records. Furthermore, a search performed based on the search parameter may search values stored in the corresponding data fields of the shared data records. For example, the search may be performed on data fields associated with an occupational title. Contact data items returning a value of "regional sales manager" may be identified and returned.

In various implementations, a filter parameter may be a parameter that identifies how items returned by the search are sorted or filtered. For example, a filter parameter may be a company name, a department at which an employee works, or a level of seniority associated with an employee. In various implementations, the filter parameter may be provided by the user after the search has returned a plurality of shared contact data items based on a search parameter. Thus, according to some implementations, the user may be presented with the results of the search at the user interface.

In various embodiments, the database service provider may identify search and filter parameters based on information included in the request issued by the user. As discussed with respect to FIG. 2, block 202, the user may specify search and filter parameters when formulating the request. Thus, the message may be a record that includes several data fields storing the specified parameters. The database service provider may identify the search and filter parameters based on the values stored in the data fields of the message. Therefore, upon receiving the request, the database service provider may identify the search and filter parameters based on the parameters specified by the user.

In FIG. 2, at block 206, shared contact data may be identified based on the identified parameters. Thus, the database service provider may search the shared contact data based on the identified search and filter parameters and identify shared contact data items that satisfy the search and filter parameters. As previously discussed, a record storing shared contact data may include a plurality of data fields, each of the data fields storing a shared contact data item representing contact information that may be associated with an entity. If a record stores a contact data item representing a value identified by the search parameter, the record may be returned as a search result.

In FIG. 2, at block 208, the identified shared contact data may be presented to a user at a user interface. Accordingly, the user may be presented with the results of the search which may include additional contact information not presently stored in the user's private contact data. Moreover, the presentation of the identified shared contact data may be filtered according to the user's preference, thus presenting the results in a manner specified by the user.

In various implementations, the identified shared contact data returned by the search may be filtered dynamically. Thus, all search results may be presented to the user at the user interface. The user may then select and apply filters to the returned search results in response to being presented with the search results. For example, the user may select and apply a first filter to the search results, such as a name of a business. The user may then select and apply a second filter, such as a department associated with the business. In some implementations, the second filter may be applied to the original search results, and the first filter may be removed in response to the user selecting the second filter. In various implementations, the search results may be filtered according to both the first and second filter in response to the user selecting the second filter.

Figure 6:
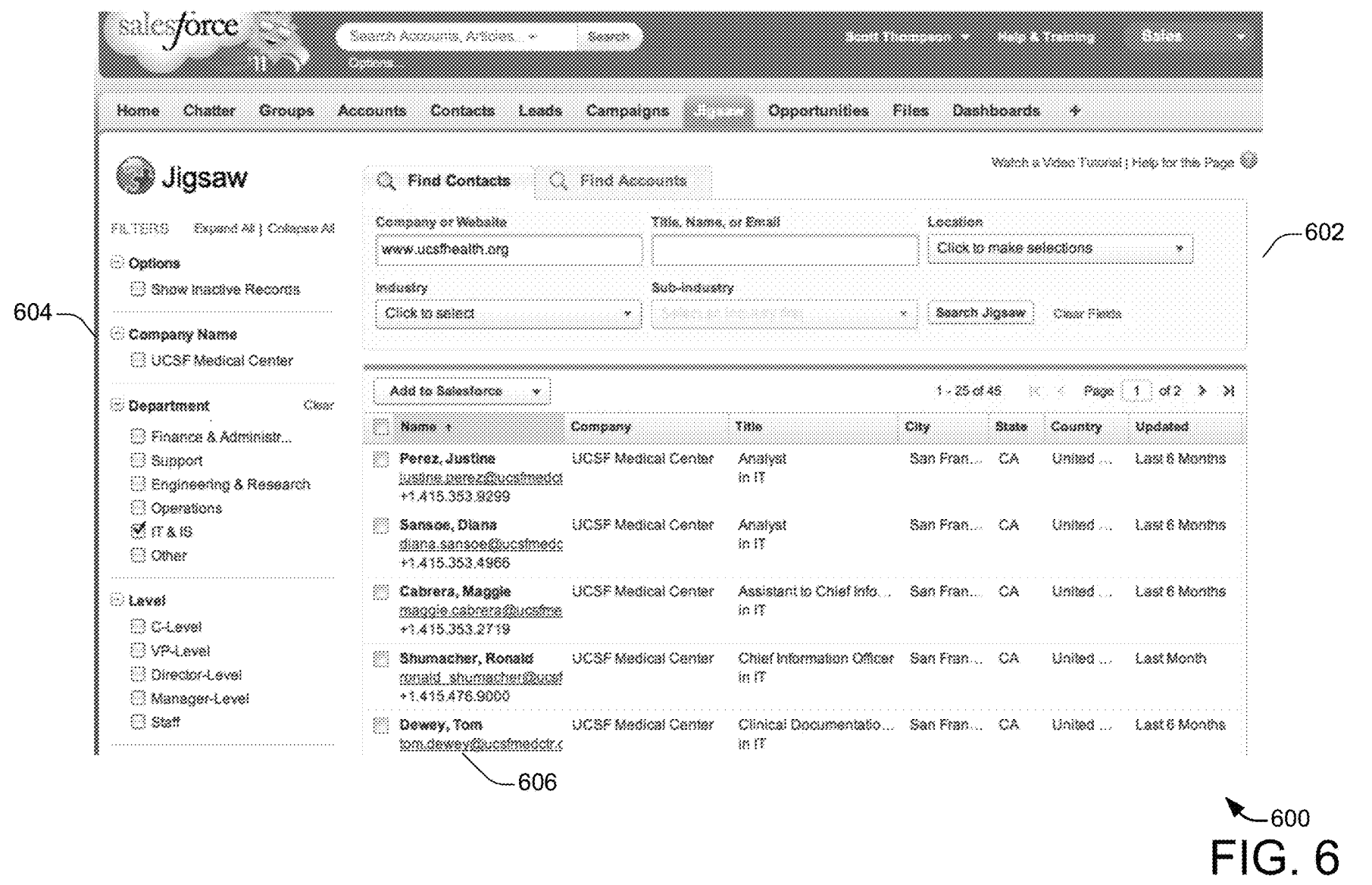

FIG. 6 illustrates an example of an image 600 of a user interface displaying identified shared contact data that is filtered by department in accordance with some implementations of method 200. In one example, image 600 of the user interface may include data fields 602, 604, and 606.

Data field 602 may include a plurality of data fields associated with the shared contact data. The user may enter the search parameters into the plurality of data fields. The search parameters may be used to perform a search that identifies a plurality of shared contact data items based on the search parameters. In this instance, a parameter of "www.ucshealth.org" has been chosen and entered into a data field identified as "Company or Website." Thus, a search may be performed to identify and return records storing shared contact data that include a value of "www.ucshealth.org" in a field identified as "company" or "website."

Data field 604 may include a plurality of data fields allowing the user to select filters to apply to the shared contact data items returned by the search. In various implementations, the filters available to the user may be organized into groups. For example, the filters may be organized or grouped according to type of information associated with an organization. In this instance, the filters are organized according to "company name," "department," and "level," where "level" identifies a contact's level within the hierarchy of an organization. In various implementations, a contact's level within an organization may be inferred by the contact's occupational title and known relationships between occupational titles.

Data field 606 may include the plurality of shared contact data items that have been returned by the search based on the search parameters specified in data field 602, and filtered according to the filter parameters specified in data field 604.

Data field 606 may include a plurality of data fields displaying various shared contact data items. In this instance, data field 606 may display a contact's name, email address, phone number, company or employer, occupational title, and geographical location. Data field 606 may also display an indication of the last time the shared business contact data item was updated. As shown in data field 606, information associated with a plurality of contacts may be simultaneously presented to the user at the user interface.

FIG. 7 illustrates an example of an image 700 of a user interface that presents the identified shared contact data after applying one or more filters in accordance with some implementations of method 200. As shown in data field 702, multiple filters may be applied simultaneously to the shared contact data items returned by the search. In this instance, the user has chosen to apply a filter of "IT & IS," "Director-Level," and "Manager-level." Accordingly, the returned items may be filtered according to a department and level associated with each shared contact data item. As shown in data field 704, only contacts having a company of "UCSF Medical Center" (as identified by the search parameter), having a level (e.g. occupational title) equivalent to "Director" or "Manager," and having a department of "IT" or "IS" are returned by the search and displayed to the user.

Returning to FIG. 2, at block 210, a selection of contact data items may be received. The selection of contact data items may be made by the user through the user interface in response to being presented with the shared contact data identified by the search. The selection may identify specific contact data items that the user has chosen to integrate into the user's own private contact data. Thus, the user may determine which of the identified shared contact data items should be stored, and which of the identified shared contact data items should not be stored.

Figure 8:
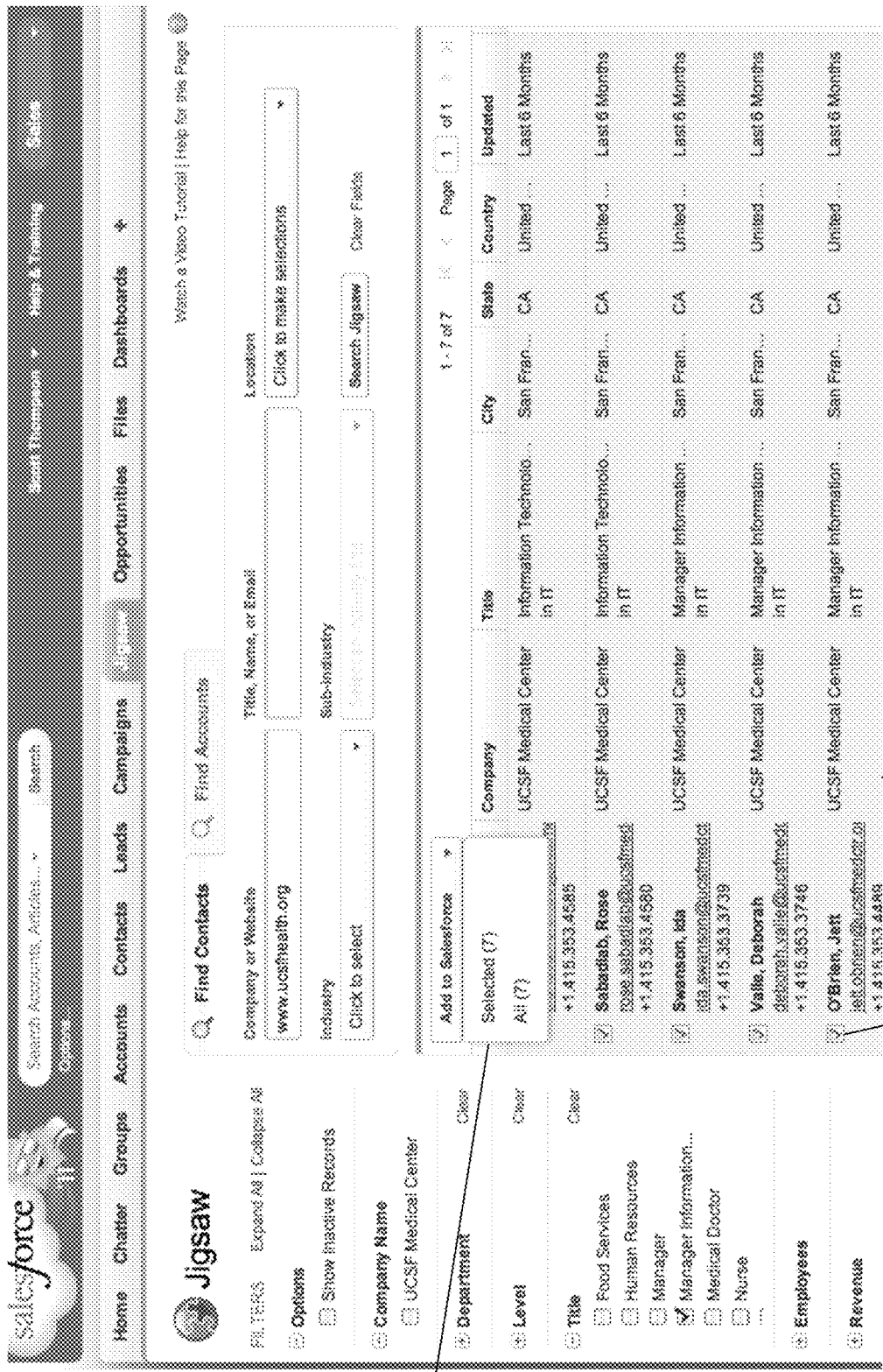
FIG. 8 illustrates an example of an image 800 of a user interface that allows a user to select shared contact data items to store as private contact data in accordance with some implementations of method 200.

FIG. 8 illustrates an example of an image 800 of a user interface that allows a user to select shared contact data items to store as private contact data in accordance with some implementations of method 200. Data field 802 may display various information associated with a plurality of shared contact data items that have been returned by a search based on a search parameter, and that have been filtered according to at least one filter parameter. In various implementations, data field 804 may include a plurality of data fields, each of the data fields being associated with one of the returned items. Each of the data fields may receive an input that indicates that the returned shared contact data item associated with the data field has been selected to be stored as private contact data. In this instance, the plurality of data fields is comprised of several checkboxes. Thus, according to various embodiments, the user may check a checkbox next to each returned item that the user determines should be included in the private contact data. Data field 806 may receive an input from the user indicating that the selected shared contact data items should be stored as private contact data. In this instance, data field 806 may provide a drop down box that identifies a location where the items should be stored. In various implementations, the location may be the user's own virtual portion of the database system.

Returning to FIG. 2, at block 212, the selected contact data items may be stored. In various implementations, the selected contact data items may be stored locally in the user's own computer system. Thus, a user may select specific contact data items that the user has determined should be included in the user's private contact data, and then store the selected contact data items locally. As previously discussed, the local computer system may be a personal computer or a mobile device. When stored locally, the user may access the contact data without a connection, such as a network connection, to the database service provider.

Moreover, according to various implementations, the user's private contact data may be stored in a virtual portion of a multi-tenant database. Accordingly, while the user interface may be presented to the user at a local computer system, the user's private contact data may be stored remotely in a multi-tenant database system that is part of a cloud-based on-demand database service environment. In this example, the selected contact data items may be stored in the virtual portion of the database system associated with the user. In various implementations, the contact data may be stored both locally and remotely.

In some implementations, the user may determine what type of record is used to store the shared contact data. As previously discussed with respect to FIG. 1, block 102, a record may be one of several types of record. For example, a record may represent a contact, lead, or account. Thus, according to various implementations, the user may determine whether the selected contact data is stored as a contact, a lead, or as an account.

Figure 9:
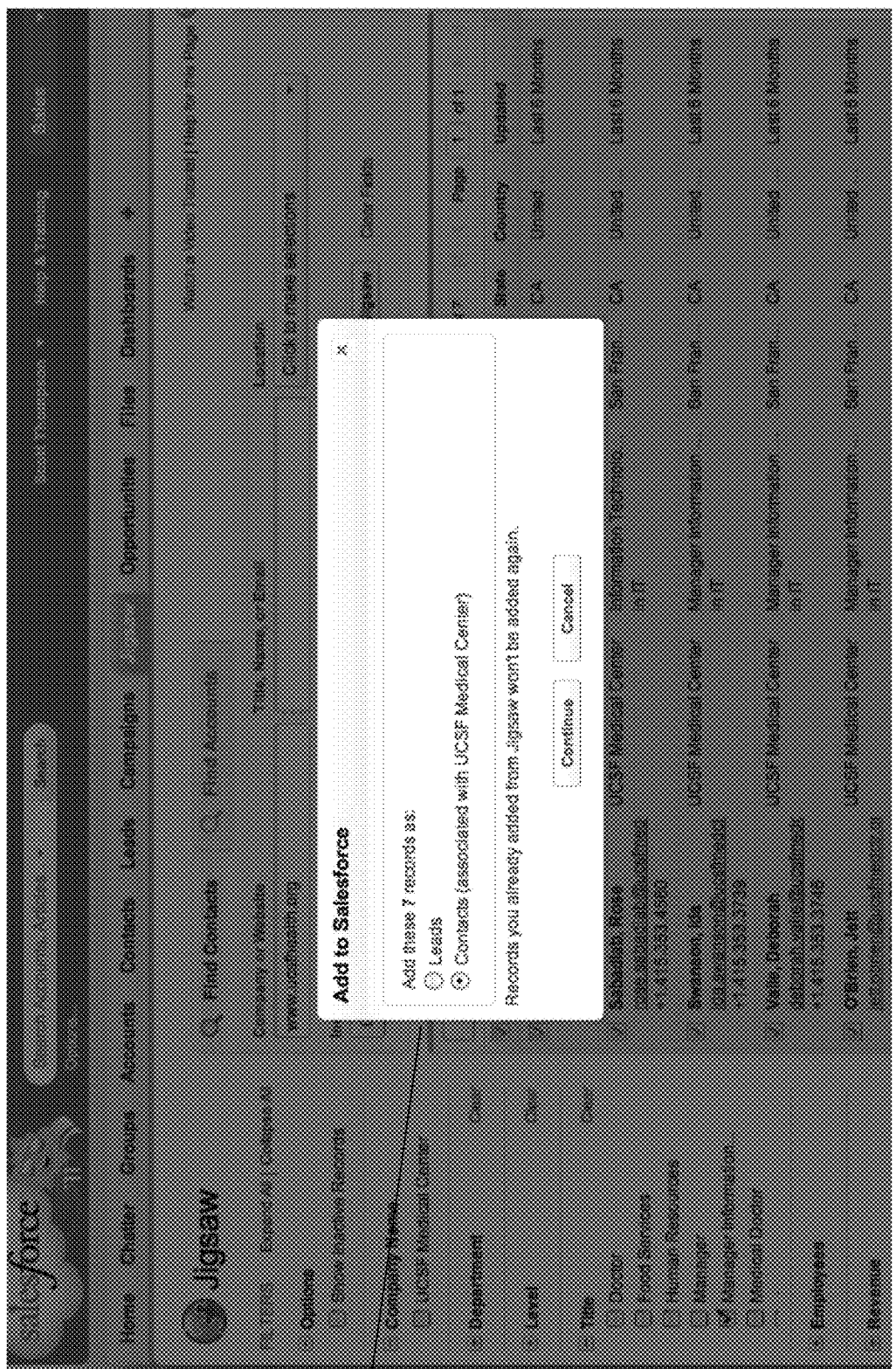
FIG. 9 illustrates an example of an image 900 of a user interface that may be used to determine how selected shared contact data items are stored as private contact data in accordance with some implementations of method 200.

FIG. 9 illustrates an example of an image 900 of a user interface that may be used to determine how selected shared contact data items are stored as private contact data in accordance with some implementations of method 200. A user may be provided with the user interface illustrated by image 900 in response to the user selecting shared contact data items to store. Data field 902 may provide the user with a list of options that may allow the user to determine how the selected shared contact data items are stored. For example, the user may provide an input to data field 902 that identifies what type of record a selected contact data item belongs to. In this instance, data field 902 has presented the user with the option of storing the selected contact data items as "Leads" or "Contacts." In this instance, the user has chosen "Contacts." Accordingly, the selected shared contact items may be stored in the private contact data as "Contacts." In various implementations, if a selected shared contact data item already exists in the private contact data, the selected item is not stored.

Returning to FIG. 2, at block 214, the shared contact data search parameters may be stored. Thus, in various implementations, in addition to storing the selected shared contact data items, the database service provider may also store the parameters used to identify the selected shared contact data items. As similarly discussed with reference to FIG. 2, block 212, the search parameters may be stored locally or remotely. In various implementations, the stored search parameters may be retrieved and used for future searches performed by the user.

In various implementations, the stored search parameters may provide a search history accessible by the user. For example, upon initiating a search, the user may access the user's search history and recall a previous search performed with parameters previously entered by the user. Thus, according to various implementations, the user may recall the results of a previously performed search based on the stored parameters.

Figure 10:
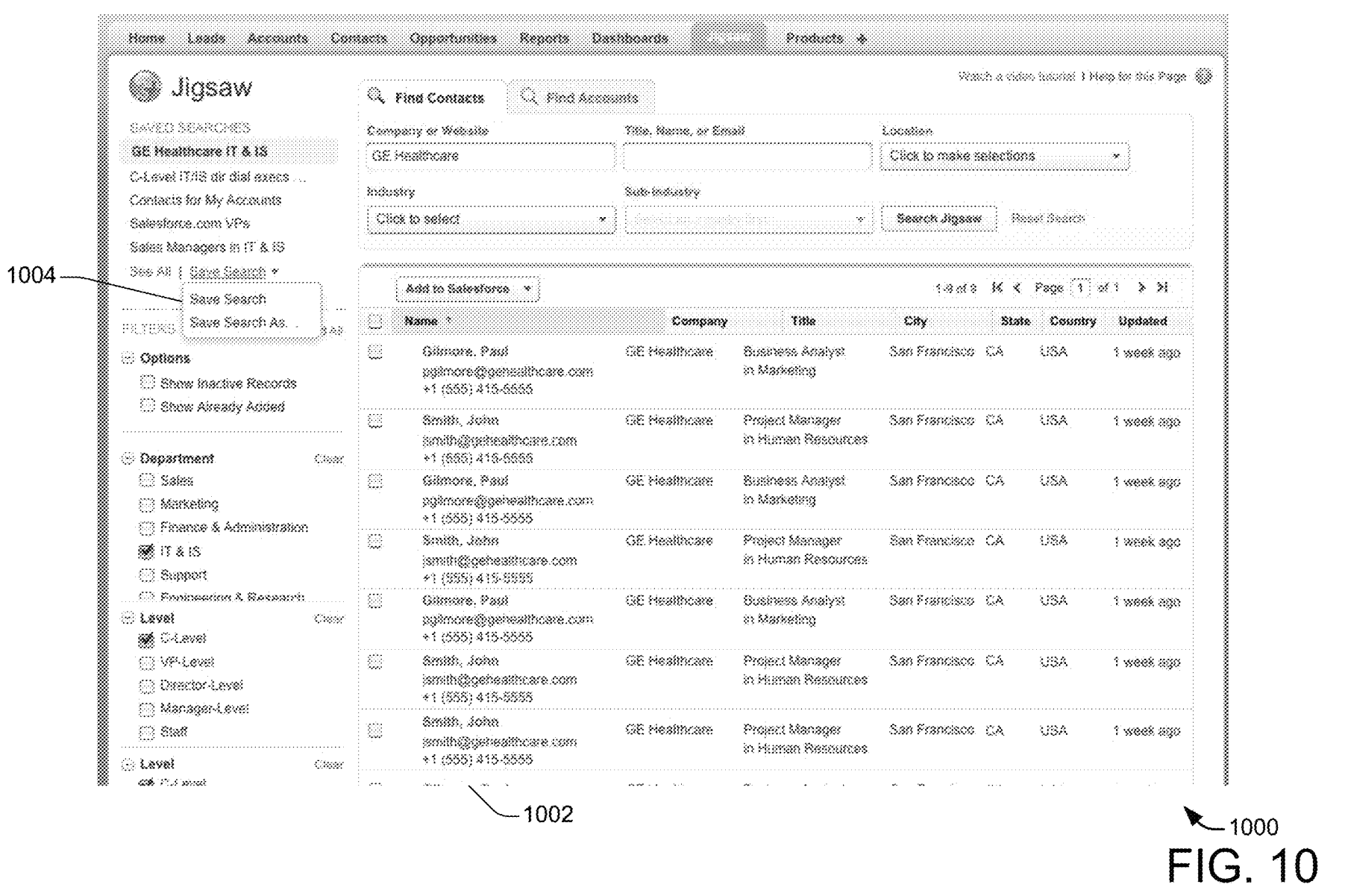

FIG. 10 illustrates an example of an image 1000 of a user interface that may be used to store search parameters in accordance with some implementations of method 200. As illustrated by data field 1002, the results of a search based on search and filter parameters may be displayed at a user interface. In various implementations, data field 1004 may be used to save the search and filter parameters, as well as the results of the search. In this instance, data field 1004 provides the user with the option to save the search for future use. Thus, according to various implementations, a user may provide an input to data field 1004, such as selecting "Save Search As," and save the search and filter parameters as well as the search results. The saved search results and parameters may be recalled at a future time. Moreover, in some implementations, a user may specify where a data object including the saved search should be stored. For example, the user may specify that the search results should be stored in a virtual portion of a database system associated with the user, or stored at a local computer system associated with the user.

Figure 3:
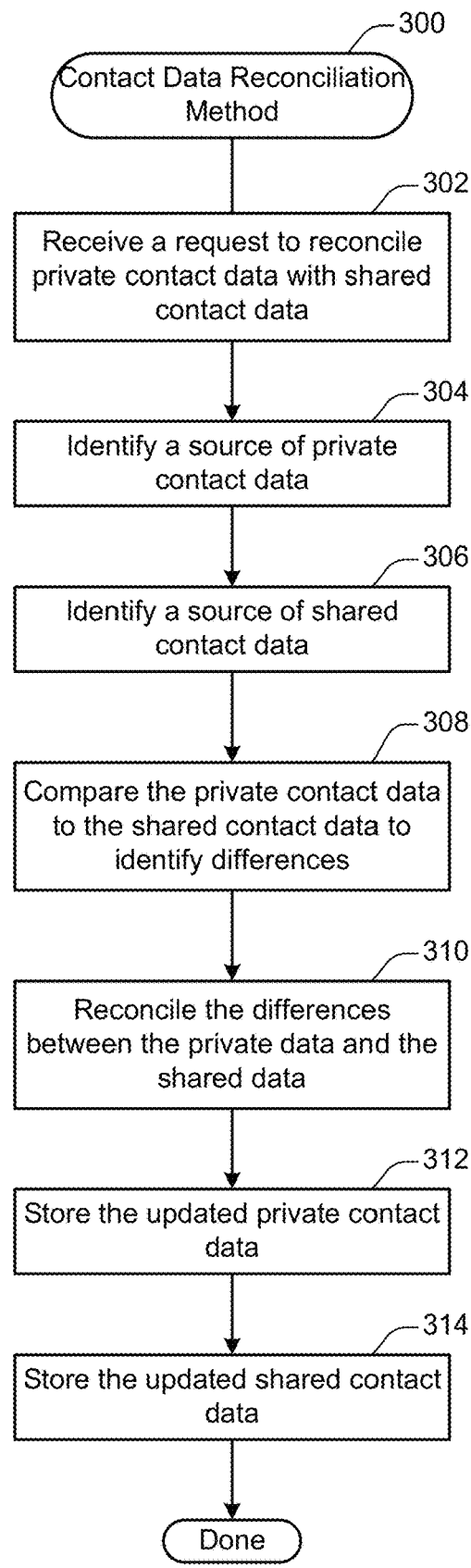
FIG. 3 shows a flowchart of an example of a contact data reconciliation method 300, performed in accordance with some implementations.

FIG. 3 shows a flowchart of an example of a contact data reconciliation method 300, performed in accordance with some implementations. In various implementations, the method 300 may be used to receive a request to reconcile private contact data with shared contact data, compare the private contact data to the shared contact data to identify differences, and reconcile the differences between the private contact data and the shared contact data. Thus, data reconciliation method 300 may be used to integrate contact data aggregated from several sources with a user's private contact data in order to enrich the user's private contact data.

In FIG. 3, at block 302, a request to reconcile private contact data with shared contact data may be received. In various implementations, reconciling the private contact data with the shared contact data may comprise a process in which differences between the two sets of data are resolved to create a unified data set. In some implementations, the request to reconcile private contact data may be issued by a user of a database service provided by a database service provider. The user may issue the request to reconcile the user's private contact data in order to import additional contact information into the user's private contact data from shared contact data, or to evaluate and reconcile differences between the private contact data and the shared contact data.

Figure 11:
FIG. 11 illustrates an example of an image 1100 of a user interface that may be used to issue a request to reconcile private contact data with shared contact data in accordance with some implementations of method 300.

FIG. 11 illustrates an example of an image 1100 of a user interface that may be used to issue a request to reconcile private contact data with shared contact data in accordance with some implementations of method 300. In some implementations, image 1100 may present a user with private contact data. Thus, image 1100 may display information associated with a specific entity or contact. For example, data field 1102 may display information regarding the identity of the entity or contact with which the displayed private contact data is associated. In this instance, data field 1104 displays various private contact data items, such as a title, department, birthdate, mailing address, and phone number. Data field 1102 indicates that the information is associated with a contact named "Tim Barr."

Data field 1106 may present the user the option of reconciling the user's private contact data, as identified by data field 1102, with shared contact data that has been aggregated from several other users. In this instance, data field 1106 provides the user with a button. If the user selects the button, a request to reconcile the private contact data with the shared contact data may be issued to the database service provider.

Data field 1110 may provide information about previously issued requests to reconcile data. Thus, in some implementations, data field 1110 may provide historical information about previous data reconciliations. In various implementations, data field 1110 may also indicate whether or not a request to reconcile data should be issued. For example, data field 1110 may include data field 1112, which may provide the user with an indication of the status of the private contact data. The status may refer to whether or not any discrepancies between the user's private contact data and the shared contact data exist. In this instance, data field 1112 indicates a status of "Clean." Accordingly, the status identified by data field 1112 indicates that the private contact data is consistent with the shared contact data because no differences exist. Thus, the information stored in the private contact data is as current as possible. In various implementations, data field 1112 may also indicate that the status of the private contact data is not "Clean." Accordingly, data field 1112 may indicate that more recent, or different, information is available from the shared contact data, and the contact data should be reconciled. Data field 1110 may also include data field 1114, which may provide additional historical information about the reconciliation process. For example, data field 1114 may indicate when the last request to reconcile data was issued, and when the status of the private contact data was last checked.

Returning to FIG. 3, at block 304, a source of private contact data may be identified. In various implementations, the source of the private contact data is the location at which the private contact data is stored. As previously discussed with reference to FIG. 2, block 212, the private contact data may be stored locally or remotely. For example, the private contact data may be stored at a computer system or mobile device used by the user. Moreover, the private contact data may be stored remotely in a multi-tenant database system operated and maintained by a database service provider.

In FIG. 3, at block 306, a source of shared contact data may be identified. In various implementations, the source of the shared contact data is the location at which the shared contact data is stored. As previously discussed with reference to FIG. 1, block 114, the shared contact data may be stored in a virtual portion of a multi-tenant database system operated and maintained by the database service provider. Thus, according to various implementations, the database service provider may identify the source of the shared contact data by determining the location at which the shared contact data is stored.

In some embodiments, the source of the shared contact data may further refer to a particular record or data object that stores shared contact data items relevant to the private contact data that is the basis of the reconciliation. For example, the source of the shared contact data may refer to a record that stores shared contact data items for a particular contact. In some implementations, the source of the shared contact data may be a plurality of records or data objects.

Figure 12:
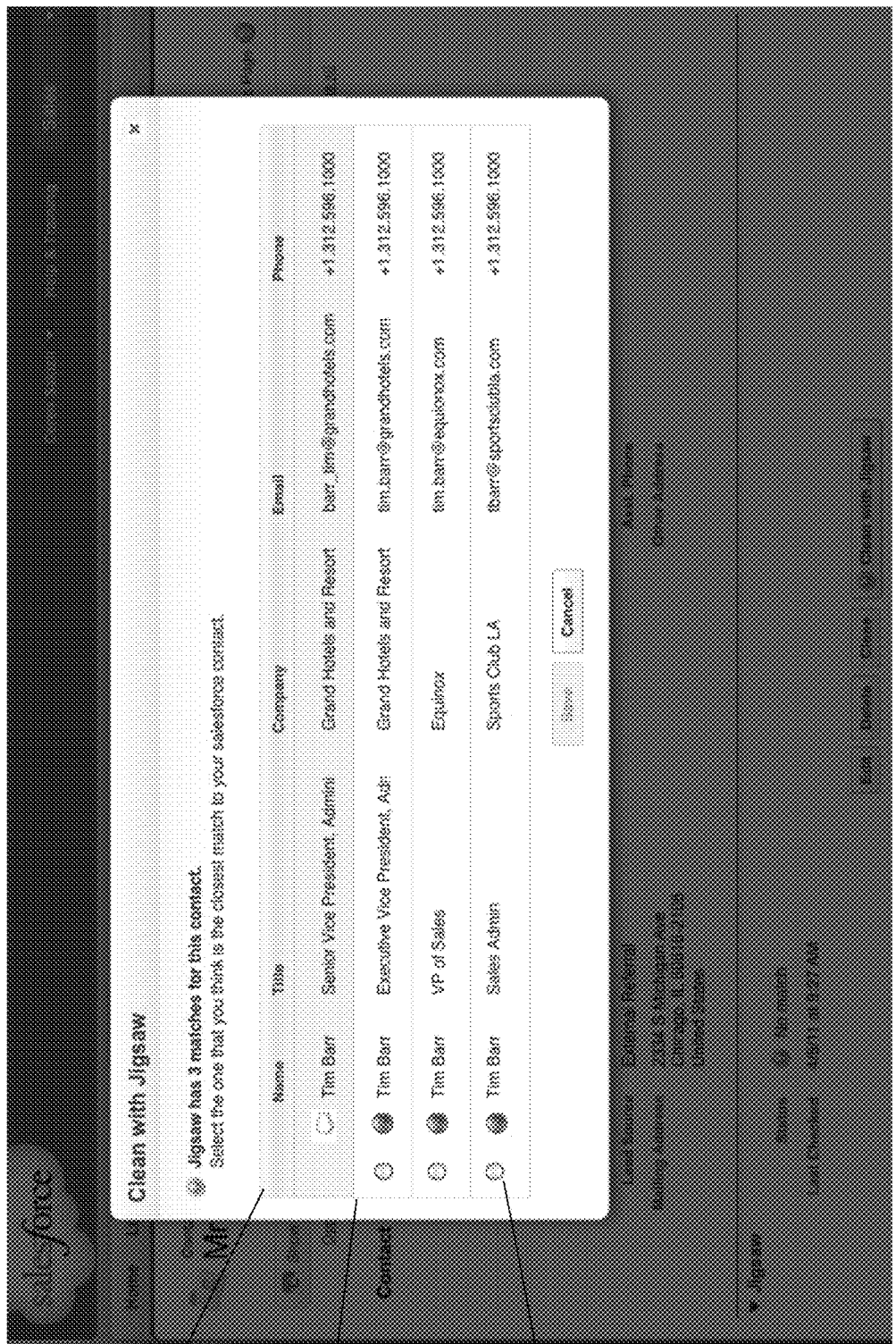
FIG. 12 illustrates an example of an image 1200 of a user interface that may be used to identify a source of shared contact data in accordance with some implementations of method 300.

FIG. 12 illustrates an example of an image 1200 of a user interface that may be used to identify a source of shared contact data in accordance with some implementations of method 300. Data field 1202 may display information about identified private contact data that may form the basis of the reconciliation process. In this instance, data field 1202 displays the name, title, company, email address, and phone number of the contact associated with the identified private contact data. Data field 1204 may display different sources of shared contact data that are available and that may be reconciled with the private contact data. In this instance, the sources are different records storing shared contact data. The user may determine which source of the shared contact data is relevant to reconciling the identified private contact data based on the information displayed in data field 1202. In this instance, each of the records is associated with a contact named "Tim Barr." However, each of the records has varying contact information. The user may identify which record is most relevant, and choose to reconcile the user's private contact data with the identified record.

Data field 1206 may receive an input that identifies which source of shared contact data should be used to reconcile the private contact data with the shared contact data. In this instance, the data field provides a button capable of receiving a selection of from the user. Thus, in various implementations, the user may select a source of shared contact data that should be reconciled with the private contact data by selecting the appropriate button corresponding to that data source.

Returning to FIG. 3, at block 308, the private contact data may be compared to the shared contact data. Differences between the private contact data and the shared contact data may be determined based on this comparison. For example, private contact data items associated with a contact, such as a sales representative employed by a company, may be stored in a first record as private contact data. The first record may include a plurality of data fields storing the various contact data items associated with the sales representative. For example, the first record may store the sales representative's business address and email address. However, the record might not include the sales representative's business phone number. A second record associated with the sales representative may be stored in the shared contact data. The second record may include the sales representative's business phone number. Thus, according to various implementations, when the first record stored as private contact data is compared to the second record stored as shared contact data, a difference between the first and second may be identified. The difference may indicate that the shared contact data includes the sales representative's business phone number, while the private contact data does not.

In various implementations, a report of the comparison of the private contact data with the shared contact data may be provided. The report may provide metadata regarding the comparison. Thus, the report may provide an overall indication of how a user's private contact data compares to the shared contact data. For example, the report may indicate how many duplicate contact data items are present (i.e. present in both the private contact data and shared contact data). The report may also indicate how many records associated with contacts are missing information and do not have a contact data item for a particular field. The report may further indicate how much of the user's contact data is incorrect. This may be based on an overall determination of how many shared contact data items conflict with or have different values than the private contact data items. As similarly discussed with reference to FIG. 1, blocks 106 through 110, the credibility of both the shared contact data items and the private contact data items may be used to determine how many of the conflicting private contact data items are less credible than the shared contact data items, and thus incorrect. In instances where contact data sets may be too large to generate a report within a reasonable period of time, a statistical sample of the contact data may be used. Thus, a comparison may be performed on the sample, or subset, of the contact data. A report generated based on this comparison may be generally representative of a comparison of the contact data set as a whole. In various implementations, the generation of a report may be an on-demand service available to a user. Thus, the user may request that the database service provider generate a report independent of method 300.

Figure 13:
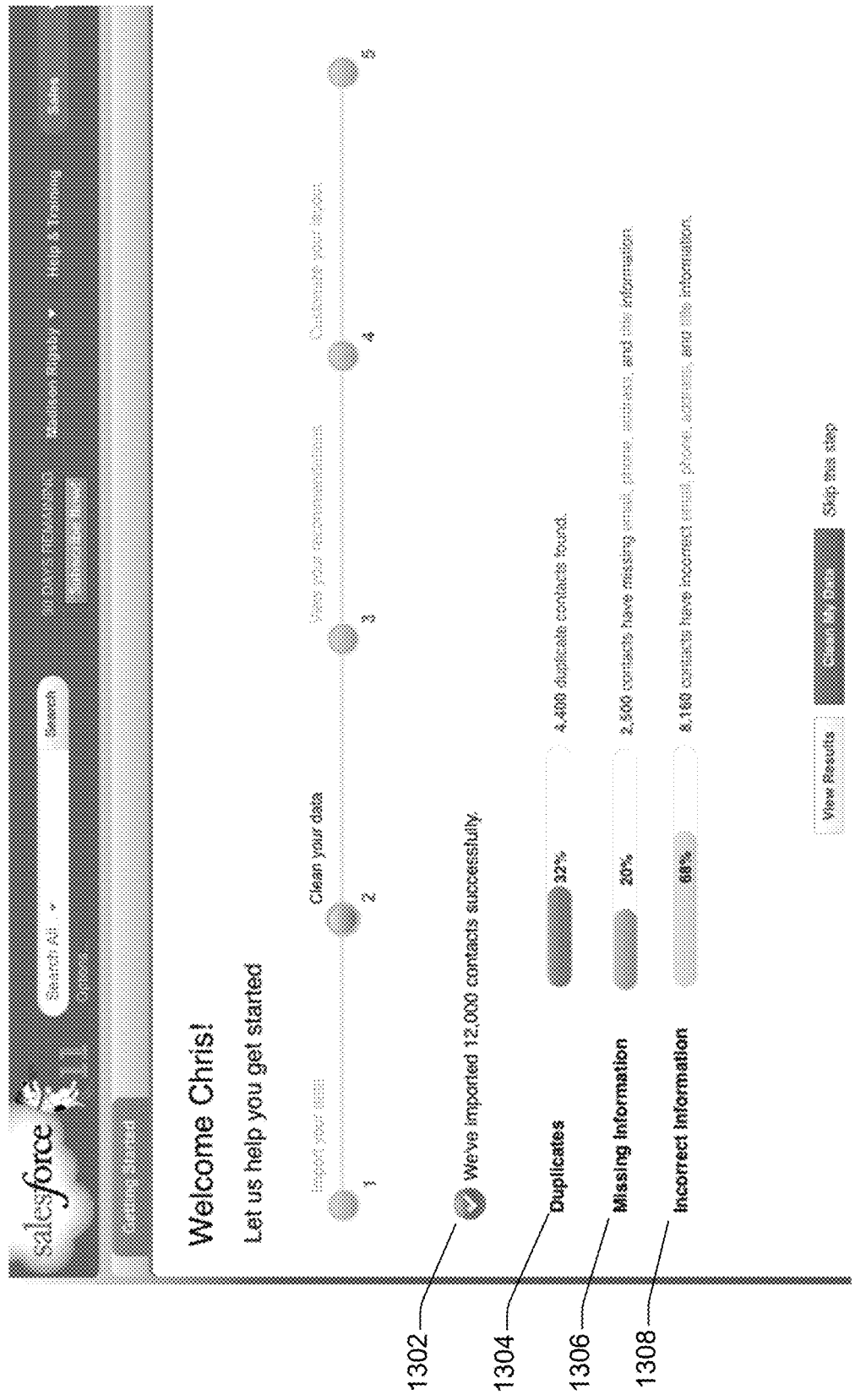
FIG. 13 illustrates an example of an image 1300 of a user interface that may provide a report about the contact data reconciliation in accordance with some implementations of method 300.

FIG. 13 illustrates an example of an image 1300 of a user interface that may provide a report in accordance with some implementations of method 300. In some implementations, the report displayed in image 1300 may be provided to a user after the reconciliation process has been completed. Data field 1302 may display information summarizing the results of the reconciliation process. In various implementations, data field 1302 displays the number of contacts for which shared contact information was imported and stored as private contact data. In this instance, data field 1302 indicates that contact data was imported for 12,000 contacts.

Data field 1304 may provide additional information about the contact data that was imported. In various implementations, data field 1304 may identify how many shared contact data records were already present in the private contact data. In this instance, data field 1304 may identify these occurrences as "Duplicates." Data field 1304 may represent the number of duplicate entries as a percentage, or a raw number. In this instance, 4,400 duplicate contacts were found.

Data field 1306 may provide information about deficiencies of the private contact data after the reconciliation process. In this instance, data field 1306 identifies such deficiencies as "Missing Information." Data field 1306 may represent the missing information as a percentage of missing contact data. The percentage may be based on a relationship between the total number of records capable of storing private contact data items and the number of those records that include empty data fields. In addition to providing a percentage, data field 1306 may provide a raw number of contacts that have missing information. In this instance, 2500 contacts have missing contact information.

Data field 1308 may provide information about the differences between the private contact data and the shared contact data. In this instance, data field 1308 identifies the differences as "Incorrect Information." Data field 1308 may represent the differences as a percentage based on a relationship between the total number of data fields storing private contact data and the number of private contact data items that conflict with the shared contact data and have been deemed less credible than the shared contact data. Furthermore, data field 1308 may provide a raw number of conflicting contact data items that were found. In this instance, 8,160 contacts had contact data that conflicted with the shared contact data and was less credible than the shared contact data.

Figure 14:
FIG. 14 illustrates an example of an image 1400 of a user interface that presents differences between the private contact data and the shared contact data in accordance with some implementations of method 300.

In various implementations, the indication of differences between the private contact data and the shared contact data may be presented as a side by side comparison displayed at the user interface. FIG. 14 illustrates an example of an image 1400 of a user interface that presents differences between the private contact data and the shared contact data in accordance with some implementations of method 300. As discussed above with reference to FIG. 11, at data field 1102, data field 1402 may display information regarding the identity of the entity or contact with which the displayed private contact data is associated. Data field 1404 may display various private contact data items, such as a title, mailing address, email address, fax number, and phone number.

Data field 1404 may include data field 1406. Data field 1406 may display information identifying the status of the private contact data. The status may refer to whether or not the private contact data is consistent with or the same as the shared contact data. Thus, according to various implementations, data field 1406 may provide an overall indication of whether or not the private contact data associated with a contact, in this instance "David Adelson," is the same as the identified shared contact data associated with this contact. In this instance, because differences exist between the data sets, data field 1406 indicates a status of "different." Moreover, data field 1406 may further present the user the option of reconciling all data associated with the contact.

Data field 1404 may also include data field 1410. Data field 1410 may provide an indication of whether or not a specific private shared contact data item associated with a contact is consistent with or the same as the corresponding shared contact data item stored in a shared contact data record associated with the contact. Thus, in various implementations, data field 1410 may display status information associated with a single private data contact item. In this instance, there is a difference between a phone number stored in the private contact data associated with "David Adelson" and the shared contact data associated "David Adelson." In response to being presented with the indication of this difference, the user may select to reconcile the difference by replacing the private contact data with the shared contact data.

In some implementations, the user may choose to view the shared contact data before choosing to reconcile the differences. Accordingly, in various implementations, data field 1412 may be presented to the user in response to receiving the selection to reconcile the difference. Data field 1412 may display the shared contact data item that is different from the private data contact item. In this instance, the shared contact data includes a phone number that is different from a phone number stored in the private contact data. The user may compare the two contact data items and determine how to reconcile the difference between the two.

Returning to FIG. 3, at block 310, the differences between the private contact data and the shared contact data may be reconciled. Reconciliation may be performed by the user. Thus, according to various implementations, the user may be presented with an indication of differences between the private contact data and the shared contact data, and in various implementations, the user may reconcile differences between the two sets of data by selecting which data should be retained. Returning to FIG. 14, the user may reconcile the differences by providing an input to data field 1414. The input received by data field 1414 may identify whether the private contact data or the shared contact data should be stored. In this instance, data field 1414 provides the user with a "thumbs up" and a "thumbs down." If the user selects the "thumbs up," the user has indicated that the phone number stored in the shared contact data item is good, and should be stored instead of the private contact data already stored in the user's private contact data. If the user selects the "thumbs down," the user has indicated that the phone number stored in the shared contact data item is bad, and should not be stored instead of the user's private contact data.

In some implementations, settings may be used to determine how and when reconciliation of differences between shared contact data and private contact data occurs automatically. For example, if a particular difference, such as missing private contact data, is identified, a specific action may be taken to reconcile the difference. In various implementations, the action may be taken automatically by the database service provider. In one example, a user's private contact data may be missing a contact data item that identifies an occupational title associated with a sales representative that the user is currently negotiating with. However, shared contact data associated with the sales representative may include a contact data item that identifies the occupational title of the user. The occupational title of the sales representative may be of value to the user because it provides additional information about the sales representative's position in the hierarchy of the sales representative's organization. A setting may indicate that this difference should be reconciled by automatically importing the shared contact data item into the private contact data. In various implementations, the user may determine the setting.

Figure 15:
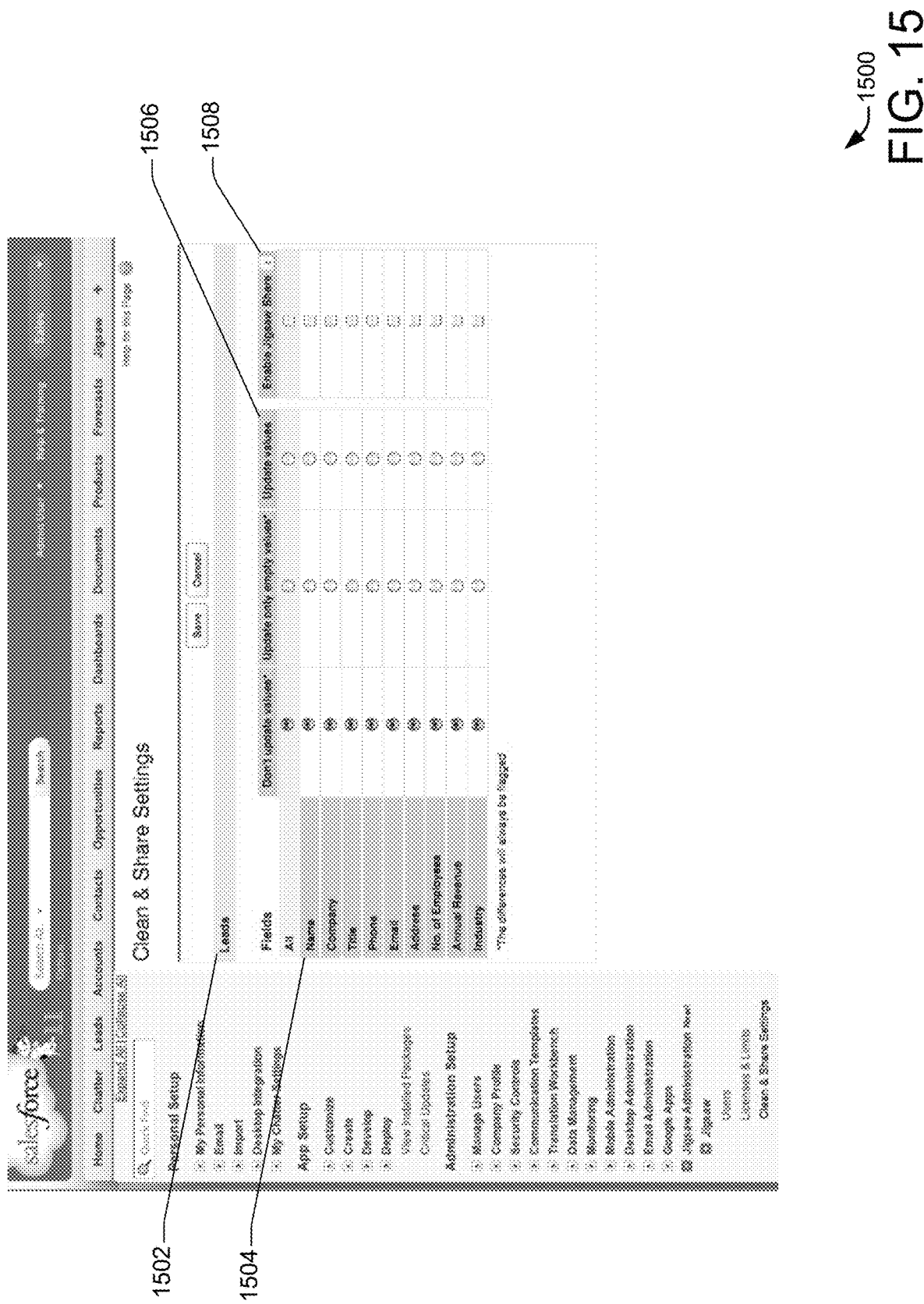
FIG. 15 illustrates an example of an image 1500 of a user interface that may be used to select and store settings associated with the reconciliation of the shared contact data with the private contact data in accordance with some implementations of method 300.

FIG. 15 illustrates an example of an image 1500 of a user interface that may be used to select and store settings associated with the reconciliation of the shared contact data with the private contact data in accordance with some implementations of method 300. In various implementations, the settings may be particular to a type of record. For example, a first set of settings may be stored and applied to Contacts, while a second set of settings is stored and applied to Groups. Data field 1502 may display information identifying which type of record the settings are applicable to. In this instance, data field 1502 indicates that the settings displayed in image 1500 are applied to "Leads." Data field 1504 may include several data fields that may be associated with data fields particular to a type of record used to store contact data items. For example, data field 1504 may include a field associated with the name of a contact.

Data field 1506 may include several settings associated with the data field identified by data field 1504. The settings may identify actions to be taken in specific circumstances. Thus, the settings may identify when private contact data should be updated with, or overwritten by, shared contact data. In this instance, the actions identified in data field 1506 are "Update values," "Update only empty values," and "Don't update values." Accordingly, the values stored in the private contact data may always be updated automatically upon initiation of the reconciliation process, only if the corresponding data item stored in the private contact data is empty, or not automatically updated at all. Data field 1506 may receive an input from the user that selects a setting for a data field identified by field 1504.

Data field 1508 may provide a data field capable of receiving a selection to share the private contact data with the shared contact data. Thus, in addition to determining to retain the user's private contact data instead of replacing it, the user may further decide to share the private contact data with the shared contact data stored by the database service provider. In this instance, data field 1508 provides a plurality of checkboxes. Each checkbox may be associated with a data field identified by data field 1504. If a checkbox is selected, the private contact data item stored within the data fields may be communicated to the shared contact data, and incorporated into the shared contact data if deemed credible, as previously discussed with reference to process 100.

Returning to FIG. 3, at block 312, the updated private contact data may be stored. As previously discussed with reference to FIG. 3, block 304, the private contact data may be stored locally or remotely. Thus, according to various implementations, the updated private contact data that has been reconciled with the shared contact data may also be stored locally or remotely.

In FIG. 3, at block 314, updated shared contact data may be stored. Thus, according to various implementations, the user's selection may be used to determine whether or not the shared contact data should be updated. If the user determines that the user's own data should be stored in the private contact data and that the shared contact data value should be discarded, the database service provider may perform a credibility determination as discussed with respect to FIG. 1, blocks 106 through 114, to determine if the user's private contact data is more credible than the shared contact data. If it is determined that the user's private contact data is more credible, the shared contact data may be updated with the private contact data, and the updated shared contact data may be stored by the database service provider in a database system associated with the database service.

Figure 4:
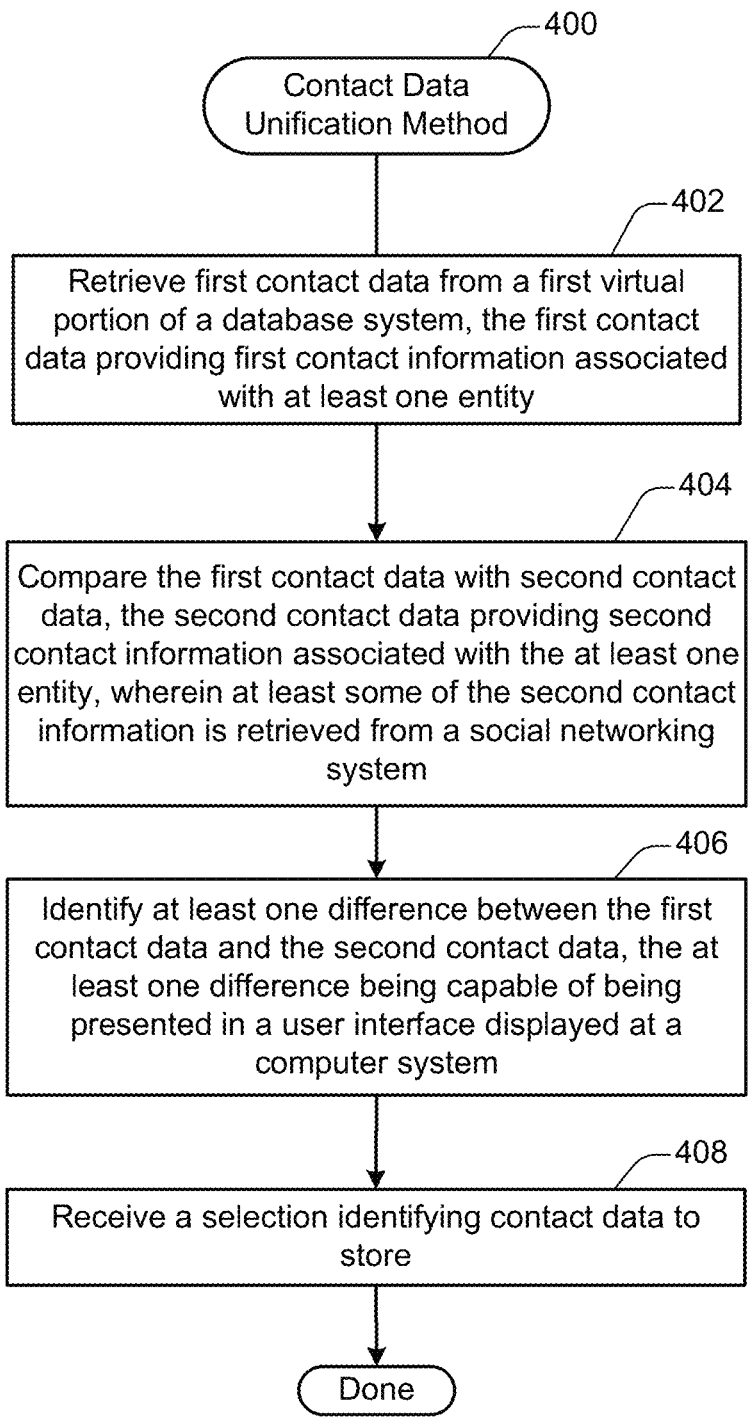
FIG. 4 shows a flowchart of an example of a contact data unification method 400, performed in accordance with some implementations.

FIG. 4 shows a flowchart of an example of a contact data unification method 400, performed in accordance with some implementations. Contact data unification method 400 may allow a user to unify the user's contact data from social networks with contact data stored in a shared database, such as that provided by Data.com, and the user's own private contact data. Unifying a user's contact data in accordance with contact data unification method 400 may allow the user to supplement the user's contact data with additional contact information not previously known to the user. Thus, unifying the user's contact data may enrich the user's contact data and provide the user with more complete contact information about various contacts associated with the user.

In some implementations, the user may subscribe to a service provided by a database service provider. Thus, the user may have contact data associated with various contacts already stored in a database service environment that is provided by the database service provider. Accordingly, in various implementations, contact data unification method 400 may occur in the database service environment which may be a multi-tenant database system.

In various implementations, a user may be associated with a social networking system. For example, the user may have several user accounts with several social networks. A social network may be a social structure of entities, such as other users, that may be connected based on various types of interdependencies. An example of an interdependency may be a friendship or a professional relationship. Exemplary social networks may include Facebook, LinkedIn, Twitter, and Yelp. As previously discussed, the user may have a user account with a social network. The user's account may have various contacts associated with it stored as contact data. The user may decide to import contact data from a social network into the database service environment to unify the user's contact data from the social network with the user's private contact data stored in the database service environment as well as shared contact data maintained by the database service provider.

Accordingly, in FIG. 4, at step 402, first contact data may be retrieved, the first contact data providing first contact information associated with at least one entity. The first contact data may be private contact data retrieved by the database service provider. As previously discussed, private contact data may be a user's own contact data that a user has previously stored in a virtual portion of a database associated with the user. Thus, private contact data associated with a contact from a social network may be retrieved in order to reconcile contact information for a particular contact from the social network.

In FIG. 4, at step 404, the first contact data may be compared with second contact data, the second contact data providing second contact information associated with the at least one entity, wherein at least some of the second contact information is retrieved from the social networking system. In various implementations, the second contact data may be retrieved from a social network associated with the user. For example, the database service provider may obtain a user's account access information, such as a user name and password, and log into the user's account. The database service provider may then query the social network's database system to retrieve contact data from the social network. For example, a list of friends may be retrieved from the social network. Each friend may have an associated record capable of being displayed as a page at a user interface. The record may include various data fields storing information such as a personal email address or a phone number. Thus, in various implementations the list of friends, as well as additional contact information associated with each of the friends, may be retrieved and stored in a database system operated and maintained by the database service provider.

In various implementations, the second contact data may also be contact information retrieved from a shared database. The shared database may include contact information that is aggregated from several users of database services provided by the on demand service provider. Thus, an entity or contact may have contact information stored in the shared database that has been aggregated from several sources. Accordingly, the shared database may have access to and store a larger collection of contact information associated with a contact than a user's own contact information.

In FIG. 4, at step 406, at least one difference between the first contact data and the second contact data may be identified. In various implementations, identifying the at least one difference may comprise identifying at least one difference between first contact items included in the first contact data and second contact items included in the second contact data. The at least one difference may be capable of being presented in a user interface displayed at a computer system. In some implementations, a report may be generated. The report may be capable of being displayed in a user interface. The report may provide a summary of at least one difference between the first contact data and the second contact data. Moreover, the report may be capable of being stored in tangible form, such as a non-volatile storage device or other non-transitory storage medium.

Accordingly, the user may be presented with differences between the user's private contact data, the shared contact data, and the contact data retrieved from the social network. The identification of differences may indicate whether or not additional information associated with a contact is available, or whether or not conflicting contact data is present. For example, contact data associated with a friend from a social network may be retrieved from the social network. The user's private contact data associated with the friend may include a name and an email address. The contact data associated with the friend may be compared with contact data retrieved from the social network. The social network may have additional information associated with the friend. For example, the social network may have a different email address and a phone number associated with the friend. Thus, the user may be presented with an indication of differences between the two sets of data that indicates that a different email address is available, and that a different phone number is available.

In FIG. 4, at step 408, a selection identifying contact data to store may be received. Thus, in response to being presented with the differences between the first contact data and the second contact data, the user may select which contact data should be retained and stored as the user's private contact data. Accordingly, the selected contact data may be stored in a virtual portion of a database system associated with the user. Returning to the previous example, if two conflicting email addresses are presented to the user, the user may choose which email address should be stored and which email address should be discarded. In various implementations, the user may choose to resolve the conflict by storing both email addresses. In response to the user making such a selection, the database service provider may receive the selection and store the selected contact data.

Figure 5:
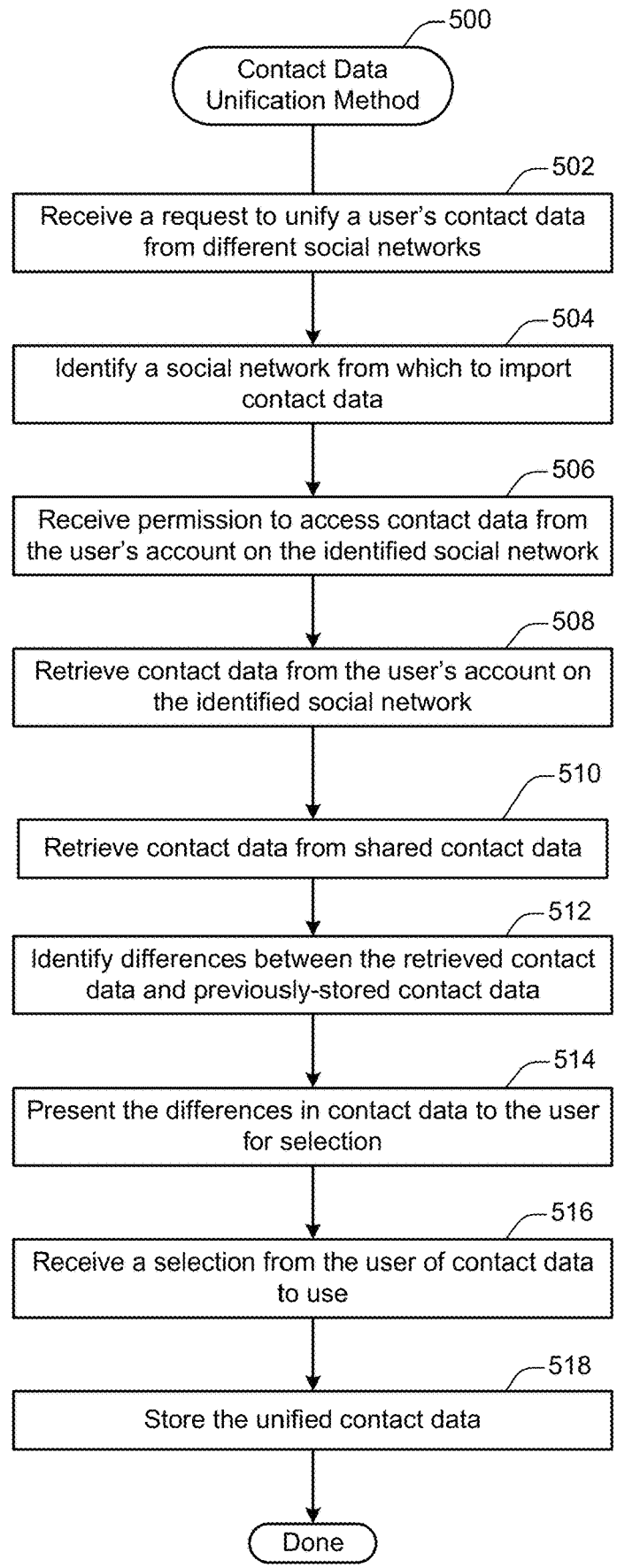
FIG. 5 shows a flowchart of an example of another contact data unification method 500, performed in accordance with some implementations.

FIG. 5 shows a flowchart of an example of another contact data unification method 500, performed in accordance with some implementations. In various implementations, method 500 may be used to retrieve contact data from a user's account on a social network, determine differences between the retrieved contact data and previously stored contact data, receive a selection of which contact data to retain, and store the unified contact data.

In FIG. 5, at block 502, a request to unify a user's contact data from different social networks may be received. As previously discussed, the user may have a user profile or account with each of a plurality of social networks. The user may have different contacts for each of the plurality of social networks. For example, the user may have a Facebook account. The user may have a first set of contacts designated as friends associated with the Facebook account. The user may also have a LinkedIn account with a second set of contacts associated with the LinkedIn account. The user may also have a third set of contacts stored as private contact data in a virtual portion of a database system provided by the database service provider.

In various implementations, each of the first, second, and third sets of contacts may be different from each other. For example, the first set of contacts may be primarily associated with friends and family, while the second set of contacts is primarily associated with business acquaintances. Thus, the first set of contacts and the second set of contacts may have few contacts in common. In some implementations, the user may wish to unify these sets of contact data with the user's private contact data to create a single set of contact data. Thus according to various implementations, the user may issue a request to unify contact data from different social networks with the user's private contact data to enrich the user's private contact data with information from the various different social networks. The request may be issued by the user via a user interface and received by the database service provider.

In FIG. 5, at block 504, a social network from which to import contact data may be identified. In various implementations, the database service provider may have previously received an indication, or list, of social networks with which the user has accounts or user profiles. The user may have also provided other account information, such as an identifier or "handle" associated with the user as well as a password that may be used to access the account. In various implementations, the user may provide this information when originally subscribing to a service provided by the database service provider. Thus, in some implementations, the database service provider may identify the social networks from which to import contact data based upon the previously-provided information in response receiving the request to unify the user's contact data. In various implementations, if the information regarding the user's social network accounts has not previously been provided, the user may be prompted to provide this information in response to receiving request to unify the user's contact data.

Figure 16:
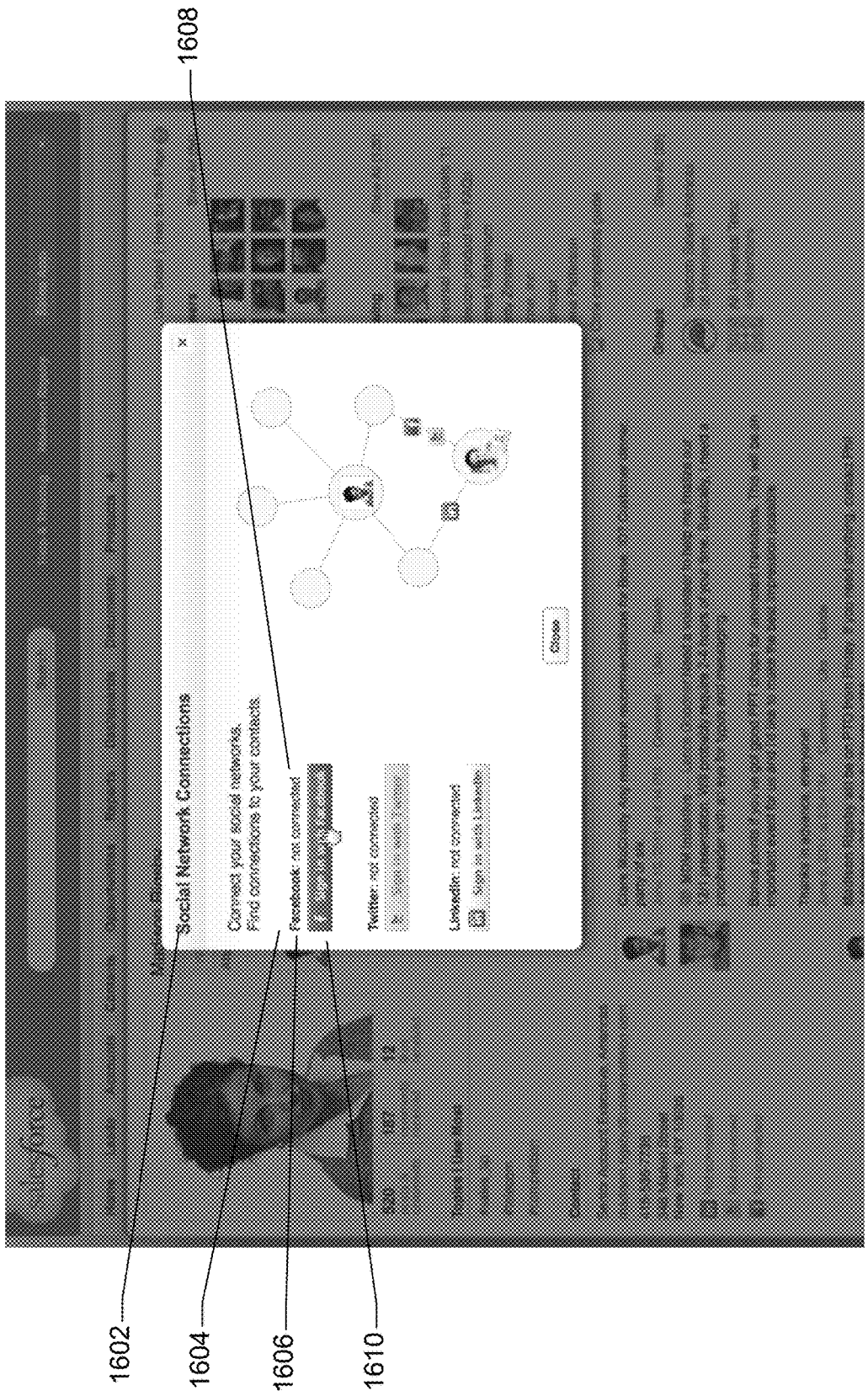

FIG. 16 illustrates an example of an image 1600 of a user interface that may be used to present a user with information that identifies which of the user's social networks the database service provider has access to and does not have access to. In various implementations, image 1600 may include data fields 1602, 1604, 1606, 1608, and 1610. Data field 1602 may display information identifying several social networking systems or social networks associated with the user that may be connected to in order to retrieve contact data. In this instance, data field 1602 indicates that contact data may be retrieved from social networks such as Facebook, Twitter, and LinkedIn. In various implementations, data field 1602 includes data field 1604.

Data field 1604 may provide detailed information about a specific social network, and whether or not the database service provider is connected to a social network. In various implementations, the database service provider may connect to a social network when the user has provided information that may be used to access, or "sign in" to the user's account. In this instance, data field 1604 provides information about the social network Facebook.

In various implementations, data field 1604 includes data fields 1606, 1608, and 1610. Data field 1606 may identify the name of a social network that may be connected to, such as Facebook. Data field 1608 may identify a status associated with the social network. In this instance, the database service provider is not connected to the social network. Thus, the database service provider is not able to access the contact data stored in the social network identified by data field 1606. Data field 1610 may be capable of receiving an input from the user directing the database service provider to connect to the social network. In this instance, the input is received via a button that presents the user with the option of signing into the social network.

In FIG. 5, at block 506, permission to access contact data form the user's account on the identified social network may be received. Thus, if the database service provider does not have access to the identified social network, access may be granted at this time. Accordingly, the user may be prompted for an action that allows the database service provider to access the user's contact data from the different social networks.

Figure 17:
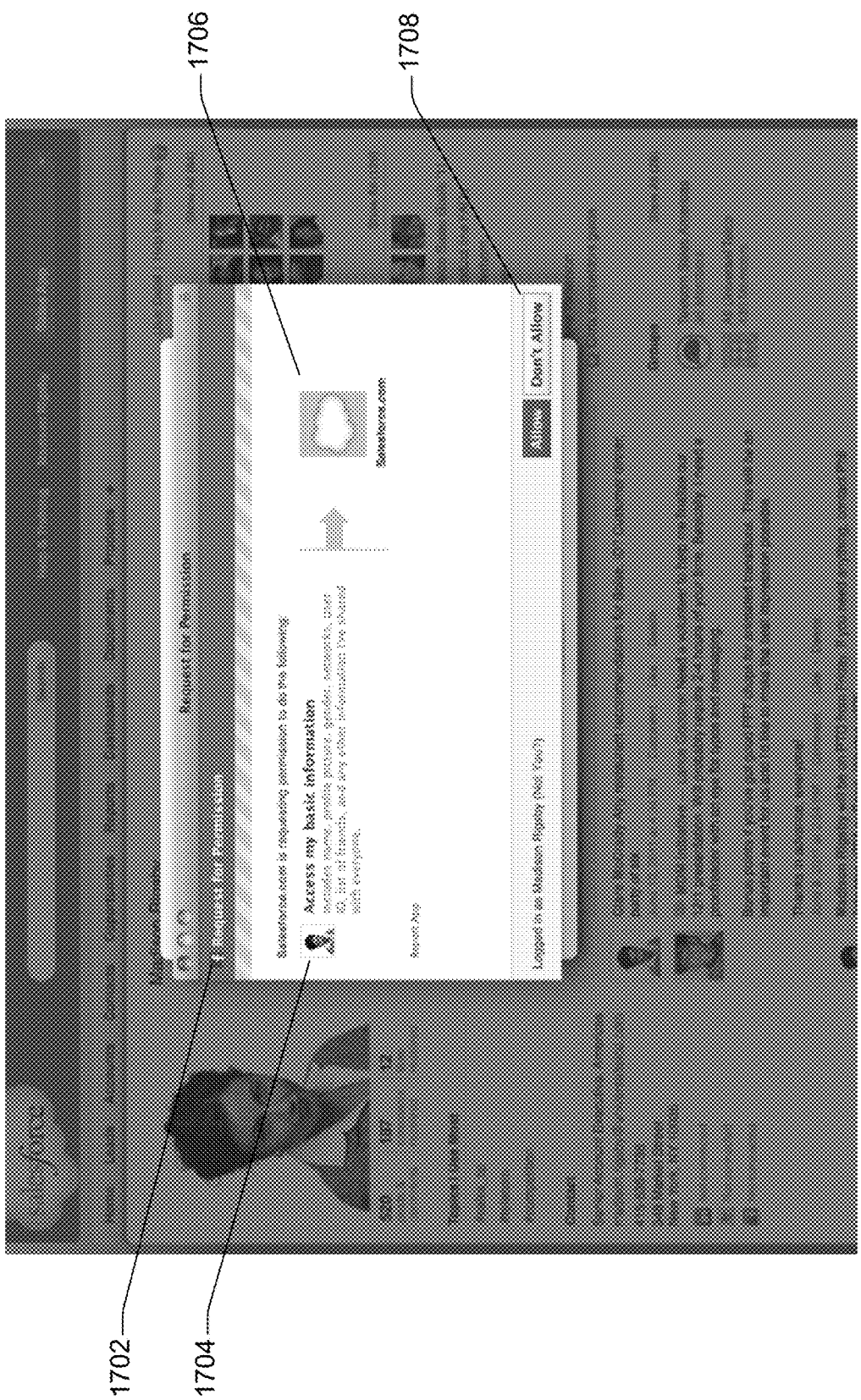
FIG. 17 illustrates an example of an image 1700 of a user interface that may be used to receive permission to access contact data from the user's account on an identified social network.

FIG. 17 illustrates an example of an image 1700 of a user interface that may be used to receive permission to access contact data from the user's account on an identified social network. Image 1700 may include data fields 1702, 1704, 1706 and 1708. Data field 1702 may identify which social network access is being granted to. In this instance, data field 1702 displays a Facebook icon, thus indicating that the user is being prompted to provide the database service provider access to the user's Facebook account. Data field 1704 may provide the user with information that describes what type of information will be accessed by the database service provider. In this instance, a dialogue box provides the user with a list of the types of information that will be accessed. Data field 1706 may identify the location where contact data retrieved from the user's account will be stored. In this instance, data field indicates that the contact information will be stored in a virtual portion of a multi-tenant database system associated with a database service subscribed to by the user. Data field 1708 may receive an input from the user that indicates that the user has given the database service provider permission to access information stored in the user's social network account. In this instance, data field 1708 provides a button that a user may select to grant permission to the database service provider.

Thus, according to various implementations, granting the database service provider permission to access the social networks may be granular because the user may identify social networks that the database service provider is permitted to access and the user may further identify social networks that the database service provider is not permitted to access. If the user has several accounts associated with several social networks, the user may be presented with a list of all of the accounts that have been identified. The user may then choose which, if any, of the accounts the database service provider has permission to access. For example, the user may grant the database service provider permission to access a first account associated with a first social network, while denying the database service provider permission to access a second account associated with a second social network.

Figure 18:
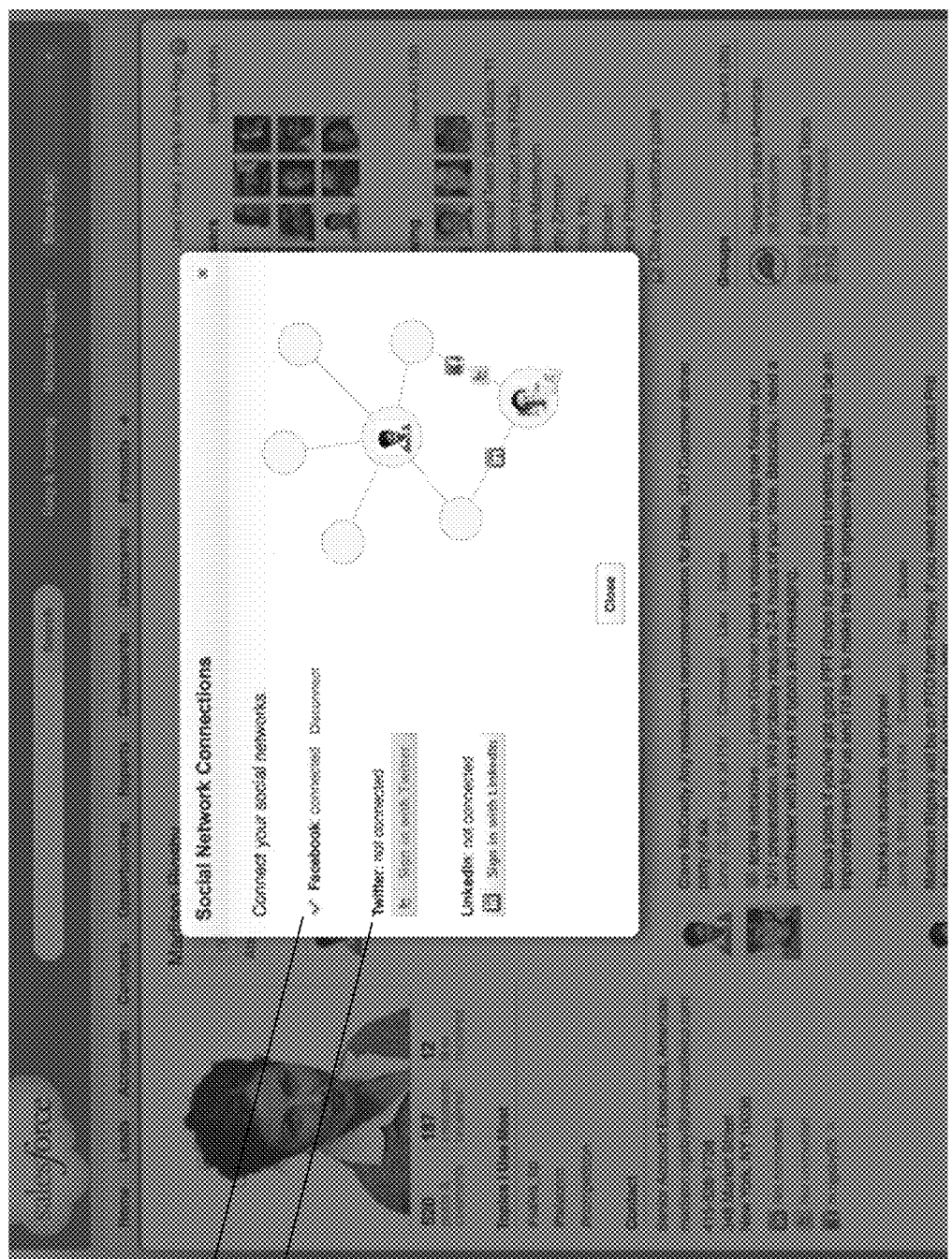
FIG. 18 illustrates an example of an image 1800 of a user interface that may be used to display which social networks have been accessed.

FIG. 18 illustrates an example of an image 1800 of a user interface that may be used to display which social networks have been accessed. Image 1800 may include data fields 1802 and 1804. Data field 1802 may display information indicating which social networks the database service provider has been granted access to. In this instance, the database service provider has been granted access to and is connected to the social network Facebook. Data field 1802 may also receive an input that revokes the permissions that has been granted to the database service provider. In this instance, data field 1802 includes a link which states "Disconnect." If selected by the user, the connection is terminated and the database service provider no longer has access to the social network. Data field 1804 may display information indicating which social networks the database service provider has not been granted permission to access. In this instance, the database service provider has not been granted permission to access and is not connected to the social networks Twitter and LinkedIn.

Returning to FIG. 5, at block 508, contact data may be retrieved from the user's account on the identified social network. Thus, in various implementations, the database service provider may use the user's login information to access the user's social network accounts. Once the database service provider has access to the accounts, contact data from the social network may be retrieved.

In various implementations, retrieving the contact data from an identified social network is achieved by identifying and locating one or more records maintained by a provider of the identified social network. The one or more records may store the user's contact data associated with the identified social network. The database service provider may copy the contact data stored in the identified record(s) to a virtual portion of a multi-tenant database system associated with the user. In various implementations, the imported contact data may be stored in an intermediary data structure for future comparison with the user's existing private contact data that is also stored in the virtual portion of a multi-tenant database system associated with the user.

In FIG. 5, at block 510, contact data may be retrieved from shared contact data maintained and operated by a database service provider. Therefore, in addition to retrieving contact data from social networks associated with the user, contact data unification method 500 may also retrieve contact data from shared contact data maintained in a shared virtual portion of a multi-tenant database system operated and maintained by a database service provider. As similarly discussed with reference to FIG. 5, block 508, one or more records storing shared contact data may be identified and contact data items stored in the one or more records may be imported into a virtual portion of a multi-tenant database system associated with the user. As previously discussed, the imported shared contact data may be stored in an intermediate data structure for future comparison with the user's private contact data.

In FIG. 5, at block 512, differences between the retrieved contact data and previously stored contact data may be identified. In various implementations, the retrieved contact data may refer to contact data retrieved from a social account associated with the user. Retrieved contact data may also refer to contact data retrieved from the shared contact data maintained by the database service provider. In some implementations, the previously stored contact data may refer to the user's private contact data that the user has stored in a virtual portion of a database system associated with a database service to which the user subscribes. Thus, differences between the user's private contact data and contact data retrieved from the shared contact data and the social network may be identified.

In various implementations, the database service provider may identify differences between the retrieved contact data and the previously stored contact data by comparing contact data items from each set of contact data. As previously discussed with reference to FIG. 1, block 102, the user's private contact data may include several records associated with various contacts known to the user. Each of the records may be a data structure that includes several data fields capable of storing contact data items. Thus, a data field included in a record associated with a contact may have a private contact data item associated with it. For example, a record associated with a contact, such as a salesperson, may have a data field capable of storing a contact data item, such as a phone number. The user may have previously supplied the phone number for the contact as private contact data. In various implementations, additional phone numbers may be available via contact data retrieved from the shared contact data or contact data retrieved from the user's social network. Upon retrieval, the retrieved additional phone numbers may be associated with the previously mentioned data field of the record associated with the contact so that a comparison of contact data may be made. In some implementations, the database service provider may compare the different contact data items. If the contact data items are different and store different values, a difference may be identified. For example, if a phone number stored in the private contact data is different than a phone number retrieved from the shared contact data, then the database service provider may determine that a difference exists.

In FIG. 5, at block 514, differences in contact data may be presented to the user for selection. Thus, in various implementations, after identifying differences between the retrieved contact data and the previously stored contact data, the database service provider may present the differences to the user at a user interface. The differences may be presented to the user in order to allow the user to determine which of the conflicting contact data should be stored as the user's private contact data.

In various implementations, similarities in contact data may also be presented at a user interface. For example, if a contact data item stored in the private contact data is the same as a contact data item stored in the shared contact data, an indication that the two contact data items are the same may be presented at the user interface. For example, a checkmark may be presented to indicate that a shared contact data item stores the same value as a corresponding private contact data item. Thus, the user may also be presented with information that indicates which private contact data items do not need to be updated.

Figure 19:
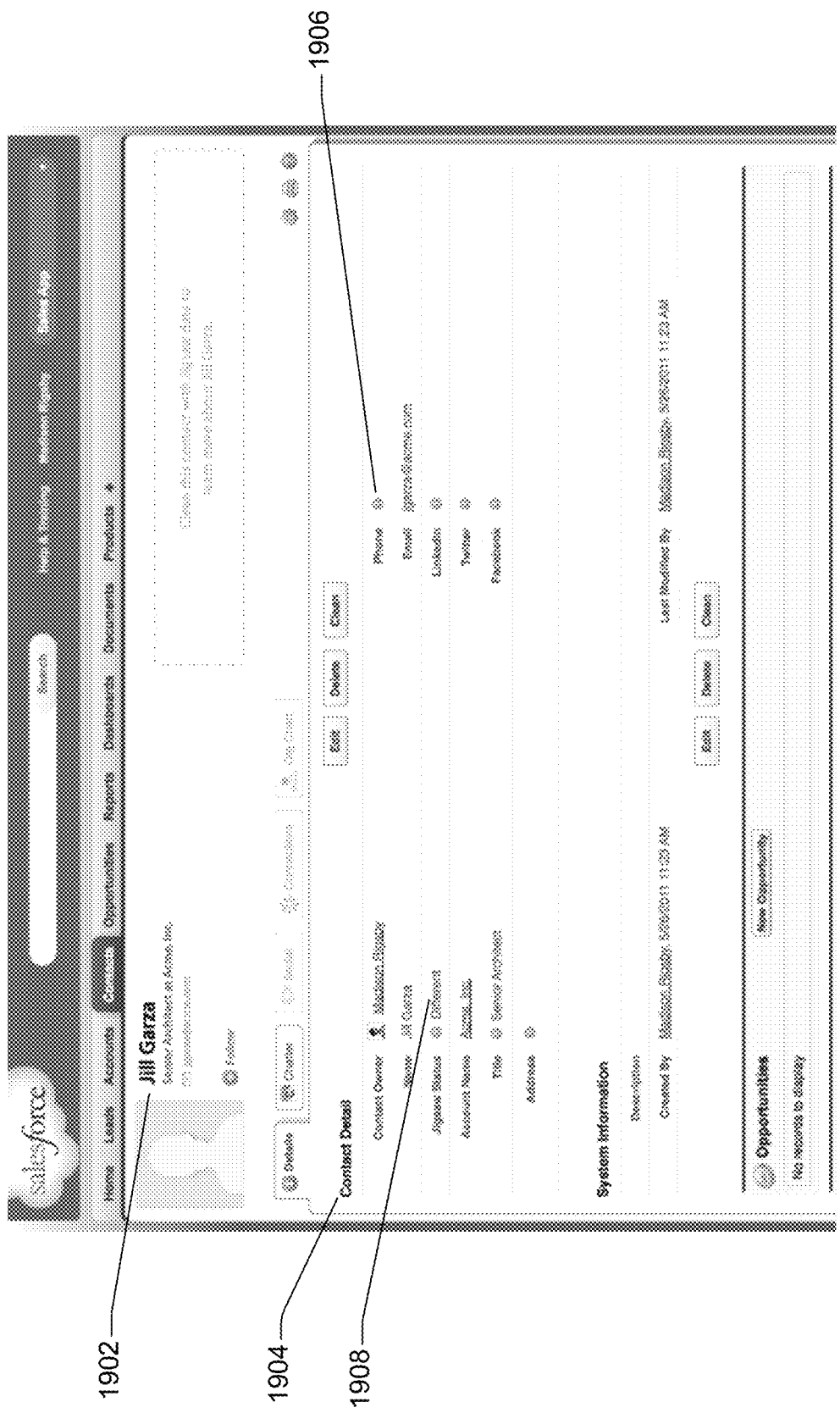
FIG. 19 illustrates an example of an image 1900 of a user interface that may be used to present differences in contact data to the user for selection.

FIG. 19 illustrates an example of an image 1900 of a user interface that may be used to present differences in contact data to the user for selection. In various implementations, image 1900 may display all differences in contact data for a particular contact. For example, a user's private contact data may include a record associated with a particular contact. The record may include various contact data items associated with that contact, such as the contact's name and email address. Accordingly, image 1900 may include data fields 1902, 1904, 1906, and 1908.

Data field 1902 may identify the contact for which differences in contact data are being presented. In this instance, contact data associated with "Jill Garza" is being displayed. Data field 1902 may also include additional contact information, such as an occupational title, or an email address. Data field 1902 may also include an area capable of displaying an image representing the contact. For example, the image may be a profile picture.

Data field 1904 may display various contact data items associated with the contact. The contact data items may be private contact data items retrieved from the user's private contact data, such as a name, email address, and professional title. In various implementations data field 1904 may include data field 1906.

Data field 1906 may display an indication that a shared contact data item corresponding to the private contact data is available and is different than the private contact data. In this instance, the private contact data associated with the contact "Jill Garza" is stored in a record including a plurality of data fields capable of storing several contact data items, including a phone number associated with "Jill Garza." While the record associated with "Jill Garza" may store a contact data item including a phone number, no such contact data item is present. However, in this instance, the retrieved shared contact data does include such a contact data item. The indication provided by data field 1906 indicates that the shared contact data includes a shared contact data item storing a phone number associated with "Jill Garza," and that a difference exists between the private contact data and the shared contact data associated with the contact "Jill Garza." In various implementations, data field 1906 may be capable of receiving an input from a user indicating that the values of the conflicting private contact data item and shared contact data item should be presented to the user so that the user may determine which contact data item should be retained and stored in the user's private contact data.

Data field 1904 may also include data field 1908. Data field 1908 provides a general indication of whether or not any differences exist between all private contact data and all shared contact data associated with the contact "Jill Garza." Therefore, while data field 1906 may provide an indication that a difference exists for a particular contact data item associated with a contact, data field 1908 may provide a general indication that one or more differences exist for all contact data associated with a contact. As discussed in greater detail below with reference to FIG. 20, data field 1908 may be capable of receiving an input from a user indicating that all contact data items from both the private contact data and the shared contact data should be presented to the user so that the user may select which contact data items should be retained and stored in the user's private contact data.

Returning to FIG. 5, at block 516, a selection of contact data may be received from the user. Thus, according to various embodiments, the user may select which of the existing private contact data, shared contact data, or contact data retrieved from the social network should be retained. In various implementations, the selection may be made via the same user interface that was used to present the differences between the contact data to the user.

Figure 20:
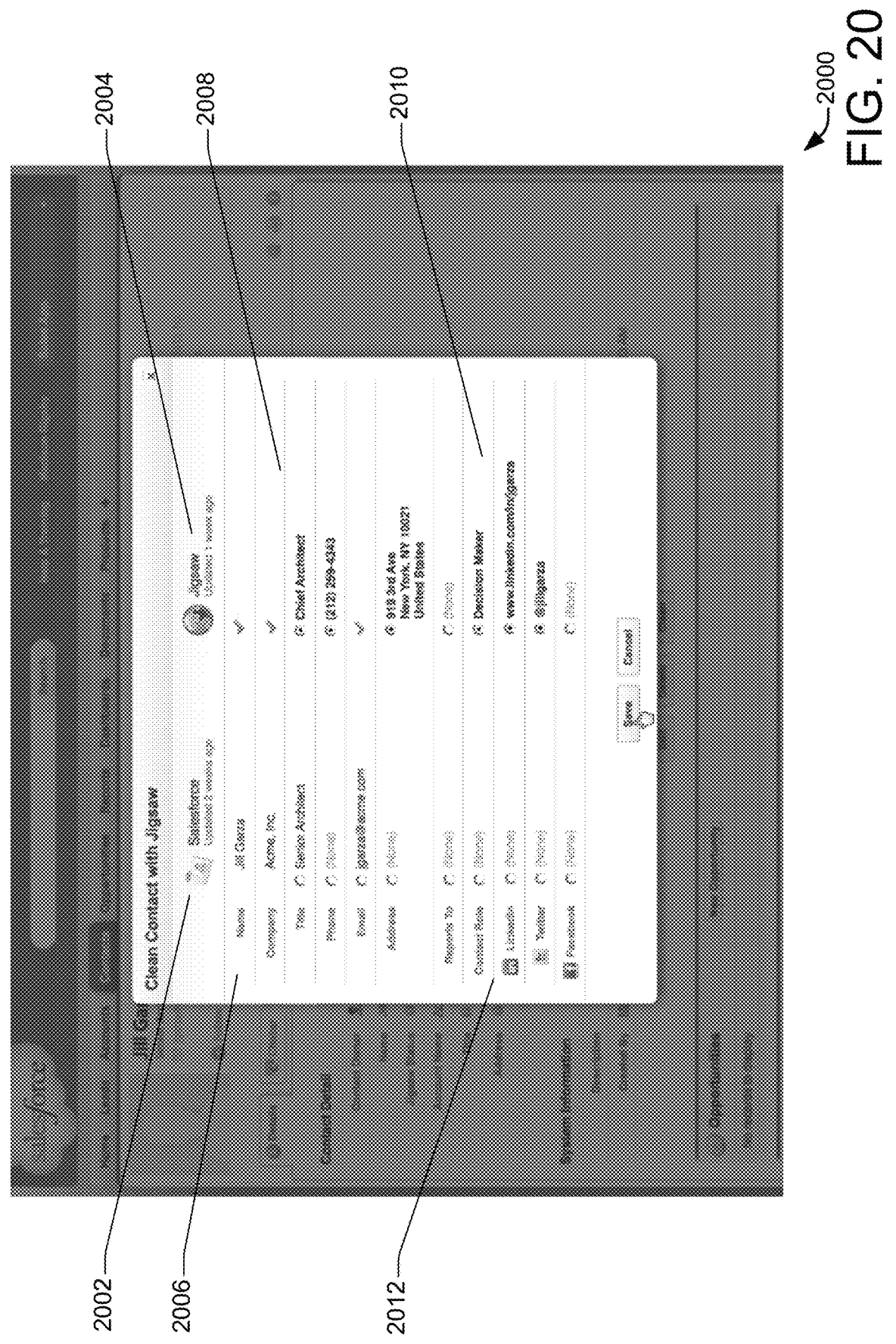

FIG. 20 illustrates an example of an image 2000 of a user interface that may be used to receive a selection of contact data from the user. As previously discussed with reference to FIG. 19, data field 1908, all contact data items associated with a contact may be presented at a user interface for a comparison. In various implementations, the presentation may indicate differences among the contact data items. Accordingly, image 2000 may include data fields 2002, 2004, 2006, 2008, 2010, and 2012.

Data fields 2002 and 2004 may display information identifying the source of the contact data items that are being presented at the user interface. In this instance, data field

2002 indicates that the source of contact data items displayed below data field 2002 have been retrieved from the user's own private contact data. In this instance, the user has subscribed to a database service named "Salesforce" that is provided by the database service provider. Part of this service entails providing the user with a virtual portion of a multi-tenant database system in which the user may store private contact data. Data field 2004 indicates that contact data items displayed below data field 2004 have been retrieved from other sources, such as shared contact data or social networks associated with the user.

Data field 2006 may display contact data items retrieved from the user's private contact data. In this instance, the contact's name, company, title, and email address are displayed. Data field 2008 may display contact data items retrieved from a different source, such as shared contact data. The contact data items displayed in data field 2008 and the private contact data items stored in data field 2006 may both correspond to data fields of a particular record used to store private contact data. For example, a record storing private contact data associated with a contact may have a data field associated with an occupational title of a contact. Thus, data field 2006 may display a private contact data item that stores a value of "Senior Architect." Data field 2008 may display a shared contact data item that stores a value of "Chief Architect." Thus, contact data items from different sources may be displayed to the user at the same time.

In various implementations, data field 2008 may further provide an indication when a contact data item displayed in data field 2006 and a contact item displayed in data field 2008 are the same. In this instance, data field 2008 displays a check mark when both the private contact data item and the contact data item from a different source, such as shared contact data, are the same.

Data field 2010 may display contact data items retrieved from a social network associated with the user. In this instance, data field 2010 displays the contact's LinkedIn webpage and the contact's Twitter handle. Data field 2012 may display corresponding information that has been retrieved from the user's private contact data. In this instance, the user's private contact data does not include such information. Thus, data field 2012 displays a value of "(None)" for each corresponding contact data item.

In some implementations, data fields 2006, 2008, 2010, and 2012 are capable of receiving an input from the user that indicates that the contact data item displayed in that particular data field should be stored as private contact data. In this instance, a button is provided next to each contact data item. If a user selects the button, the contact data item associated with the button will be stored as private contact data. For example, data field 2010 displays a contact data retrieved from a social network associated with the user that stores a value of "www.lindin.com/in/jillgarza." In contrast, data field 2012 indicates that no equivalent private contact data item is available. The user may select the button associated with the contact data item retrieved from the social network to indicate that the contact data item storing a value of "www.lindin.com/in/jillgarza" should be stored in the user's private contact data.

Returning to FIG. 5, at block 518, the unified contact data may be stored. In various implementations, the unified contact data is stored in a virtual portion of a multi-tenant database system associated with the user. Thus, the unified contact data may be incorporated into the user's private contact data and stored as the user's private contact data. In some implementations, the unified contact data may also be stored locally. Thus, the unified contact data may be stored locally on the user's computing system. In various implementations, the computing system may be a personal computer or mobile device. By storing the unified contact data locally, the user may have access to the unified contact data even when no internet connection to the database system operated by the database service provider is present.

Figure 21:
FIG. 21 illustrates an example of an image 2100 of a user interface that may display the unified contact data after it has been stored.
Figure 22A:
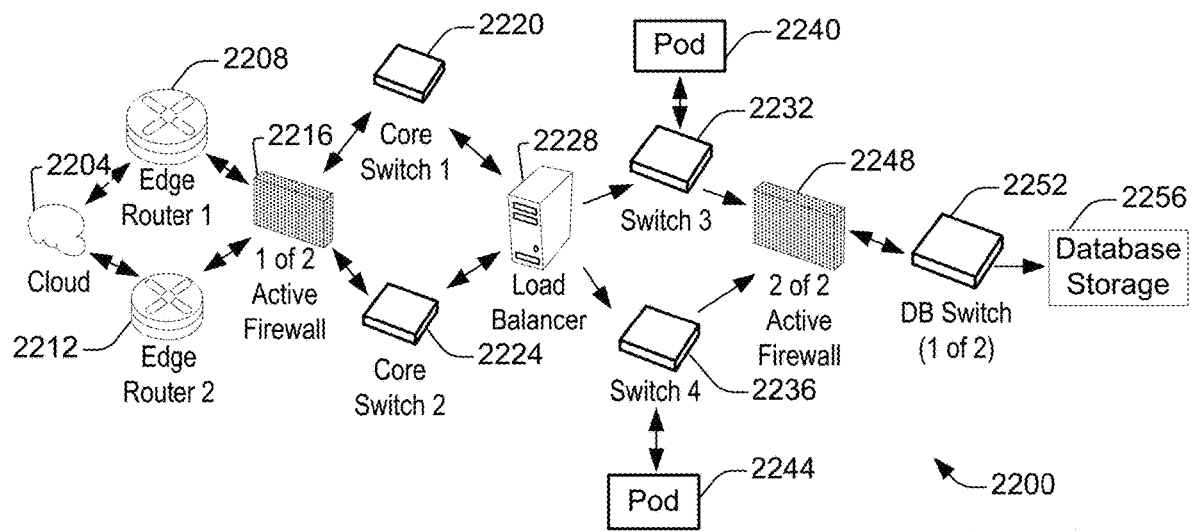
FIG. 22A shows a system diagram 2200 illustrating architectural components of an on-demand service environment that may be used to implement a contact data unification method, in accordance with some implementations.

FIG. 21 illustrates an example of an image 2100 of a user interface that may display the unified contact data after it has been stored. As similarly discussed with reference to FIG. 18, a record may store contact data items associated with a particular contact. Accordingly, image 2100 may include data fields 2102, 2104, and 2106. Data field 2102 may identify the contact associated with the record currently being displayed. In this instance, the contact is "Jill Garza." In contrast to image 1900, data field 2102 of image 2100 includes an image of Jill Garza that has been imported from a social network associated with the user. Data field 2104 displays all contact data items stored in the record that are associated with Jill Garza. In contrast to image 1900, all of the contact data item fields displayed within data field 2104 have contact data items, many of which have been imported from shared contact data or a social network associated with the user. In various implementations, data field 2104 may further include data field 2106. Data field 2106 may provide an indication of whether or not any differences exist between the user's private contact data and contact data from other sources, such as shared contact data or social networks associated with the user. In this instance, data field displays a value of "matched" which indicates that no differences exist. FIG. 22A shows a system diagram 2200 illustrating architectural components of an on-demand service environment that may be used to implement a contact data unification method, in accordance with some implementations.

A client machine located in the cloud 2204 (or Internet) may communicate with the on-demand service environment via one or more edge routers 2208 and 2212. The edge routers may communicate with one or more core switches 2220 and 2224 via firewall 2216. The core switches may communicate with a load balancer 2228, which may distribute server load over different pods, such as the pods 2240 and 2244. The pods 2240 and 2244, which may each include one or more servers and/or other computing resources, may perform data processing and other operations used to provide on-demand services. Communication with the pods may be conducted via pod switches 2232 and 2236. Components of the on-demand service environment may communicate with a database storage system 2256 via a database firewall 2248 and a database switch 2252.

Figure 22B:
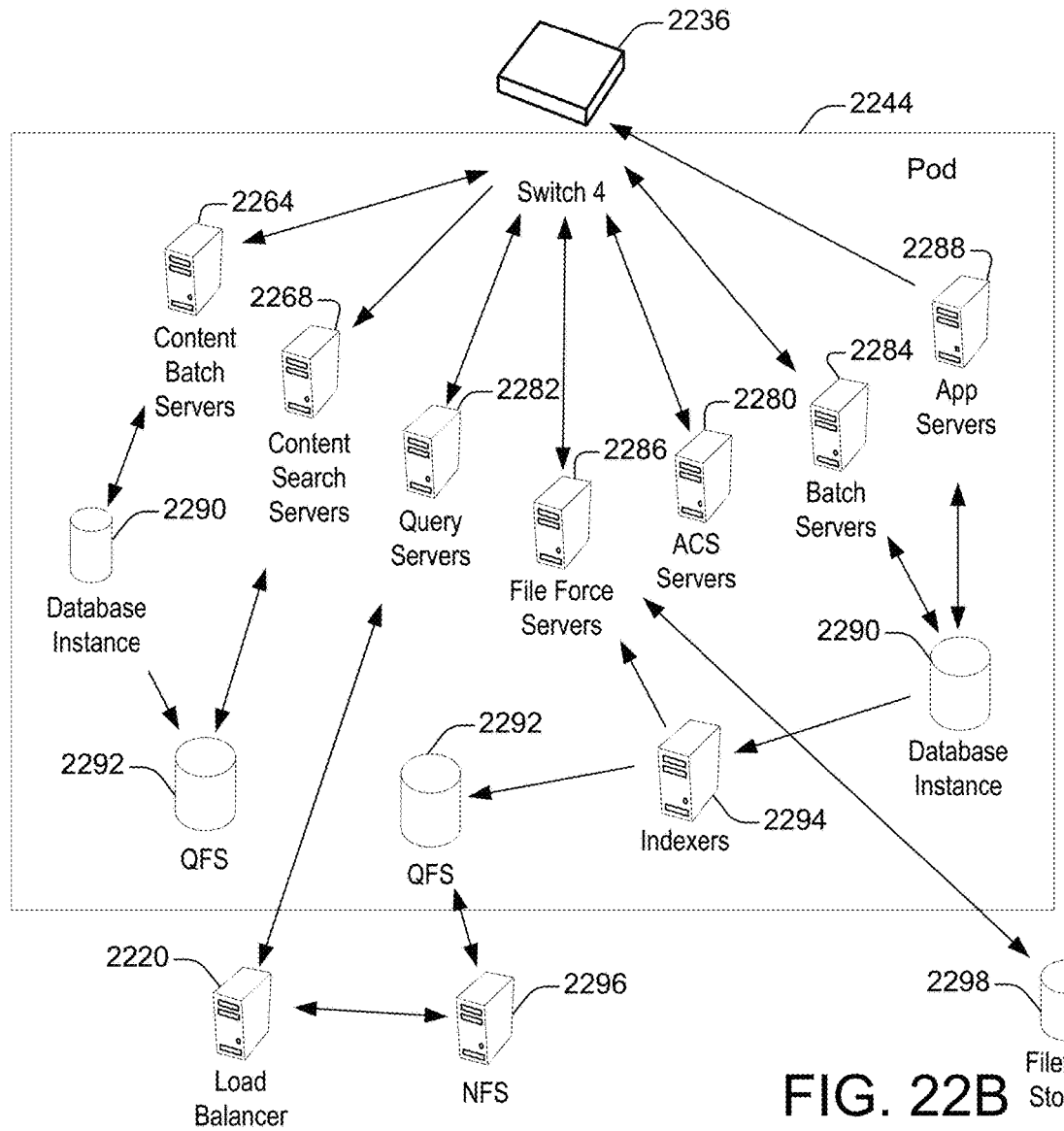
FIG. 22B shows a system diagram further illustrating architectural components of an on-demand service environment that may be used to implement a contact data unification method, in accordance with some implementations.

As shown in FIGS. 22A and 22B, accessing an on-demand service environment may involve communications transmitted among a variety of different hardware and/or software components. Further, the on-demand service environment 2200 is a simplified representation of an actual on-demand service environment. For example, while only one or two devices of each type are shown in FIGS. 22A and 22B, some embodiments of an on-demand service environment may include anywhere from one to many devices of each type. Also, the on-demand service environment need not include each device shown in FIGS. 22A and 22B, or may include additional devices not shown in FIGS. 22A and 22B.

Moreover, one or more of the devices in the on-demand service environment 2200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 2204 is intended to refer to a data network or plurality of data networks, often including the Internet. Client machines located in the cloud 2204 may communicate with the on-demand service environment to access services provided by the on-demand service environment. For example, client machines may access the on-demand service environment to retrieve, store, edit, and/or process information.

In some embodiments, the edge routers 2208 and 2212 route packets between the cloud 2204 and other components of the on-demand service environment 2200. The edge routers 2208 and 2212 may employ the Border Gateway Protocol (BGP). The BGP is the core routing protocol of the Internet. The edge routers 2208 and 2212 may maintain a table of IP networks or 'prefixes' which designate network reachability among autonomous systems on the Internet.

In one or more embodiments, the firewall 2216 may protect the inner components of the on-demand service environment 2200 from Internet traffic. The firewall 2216 may block, permit, or deny access to the inner components of the on-demand service environment 2200 based upon a set of rules and other criteria. The firewall 2216 may act as one or more of a packet filter, an application gateway, a stateful filter, a proxy server, or any other type of firewall.

In some embodiments, the core switches 2220 and 2224 are high-capacity switches that transfer packets within the on-demand service environment 2200. The core switches 2220 and 2224 may be configured as network bridges that quickly route data between different components within the on-demand service environment. In some embodiments, the use of two or more core switches 2220 and 2224 may provide redundancy and/or reduced latency.

In some embodiments, the pods 2240 and 2244 may perform the core data processing and service functions provided by the on-demand service environment. Each pod may include various types of hardware and/or software computing resources. An example of the pod architecture is discussed in greater detail with reference to FIG. 22B.

In some embodiments, communication between the pods 2240 and 2244 may be conducted via the pod switches 2232 and 2236. The pod switches 2232 and 2236 may facilitate communication between the pods 2240 and 2244 and client machines located in the cloud 2204, for example via core switches 2220 and 2224. Also, the pod switches 2232 and 2236 may facilitate communication between the pods 2240 and 2244 and the database storage 2256.

In some embodiments, the load balancer 2228 may distribute workload between the pods 2240 and 2244. Balancing the on-demand service requests between the pods may assist in improving the use of resources, increasing throughput, reducing response times, and/or reducing overhead. The load balancer 2228 may include multilayer switches to analyze and forward traffic.

In some embodiments, access to the database storage 2256 may be guarded by a database firewall 2248. The database firewall 2248 may act as a computer application firewall operating at the database application layer of a protocol stack. The database firewall 2248 may protect the database storage 2256 from application attacks such as structure query language (SQL) injection, database rootkits, and unauthorized information disclosure.

In some embodiments, the database firewall 2248 may include a host using one or more forms of reverse proxy services to proxy traffic before passing it to a gateway router. The database firewall 2248 may inspect the contents of database traffic and block certain content or database requests. The database firewall 2248 may work on the SQL application level atop the TCP/IP stack, managing applications' connection to the database or SQL management interfaces as well as intercepting and enforcing packets traveling to or from a database network or application interface.

In some embodiments, communication with the database storage system 2256 may be conducted via the database switch 2252. The multi-tenant database system 2256 may include more than one hardware and/or software components for handling database queries. Accordingly, the database switch 2252 may direct database queries transmitted by other components of the on-demand service environment (e.g., the pods 2240 and 2244) to the correct components within the database storage system 2256.

In some embodiments, the database storage system 2256 is an on-demand database system shared by many different organizations. The on-demand database system may employ a multi-tenant approach, a virtualized approach, or any other type of database approach. An on-demand database system is discussed in greater detail with reference to FIGS. 23 and 24.

FIG. 22B shows a system diagram further illustrating architectural components of an on-demand service environment that may be used to implement a contact data unification method, in accordance with some implementations.

In some embodiments, each pod may include a variety of servers and/or other systems. The pod 2244 includes one or more content batch servers 2264, content search servers 2268, query servers 2272, file force servers 2276, access control system (ACS) servers 2280, batch servers 2284, and app servers 2288. Also, the pod 2244 includes database instances 2290, quick file systems (QFS) 2292, and indexers 2294. In one or more embodiments, some or all communication between the servers in the pod 2244 may be transmitted via the switch 2236.

In some embodiments, the application servers 2288 may include a hardware and/or software framework dedicated to the execution of procedures (e.g., programs, routines, scripts) for supporting the construction of applications provided by the on-demand service environment 2200 via the pod 2244. Some such procedures may include operations for providing the services described herein.

The content batch servers 2264 may requests internal to the pod. These requests may be long-running and/or not tied to a particular customer. For example, the content batch servers 2264 may handle requests related to log mining, cleanup work, and maintenance tasks.

The content search servers 2268 may provide query and indexer functions. For example, the functions provided by the content search servers 2268 may allow users to search through content stored in the on-demand service environment.

The Fileforce servers 2276 may manage requests information stored in the Fileforce storage 2278. The Fileforce storage 2278 may store information such as documents, images, and basic large objects (BLOBs). By managing requests for information using the Fileforce servers 2276, the image footprint on the database may be reduced.

The query servers 2272 may be used to retrieve information from one or more file systems. For example, the query system 2272 may receive requests for information from the app servers 2288 and then transmit information queries to the NFS 2296 located outside the pod.

The pod 2244 may share a database instance 2290 configured as a multi-tenant environment in which different organizations share access to the same database. Additionally, services rendered by the pod 2244 may require various hardware and/or software resources. In some embodiments, the ACS servers 2280 may control access to data, hardware resources, or software resources.

In some embodiments, the batch servers 2284 may process batch jobs, which are used to run tasks at specified times. Thus, the batch servers 2284 may transmit instructions to other servers, such as the app servers 2288, to trigger the batch jobs.

In some embodiments, the QFS 2292 may be an open source file system available from Sun Microsystems® of Santa Clara, California. The QFS may serve as a rapid-access file system for storing and accessing information available within the pod 2244. The QFS 2292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 2268 and/or indexers 2294 to identify, retrieve, move, and/or update data stored in the network file systems 2296 and/or other storage systems.

In some embodiments, one or more query servers 2272 may communicate with the NFS 2296 to retrieve and/or update information stored outside of the pod 2244. The NFS 2296 may allow servers located in the pod 2244 to access information to access files over a network in a manner similar to how local storage is accessed.

In some embodiments, queries from the query servers 2222 may be transmitted to the NFS 2296 via the load balancer 2220, which may distribute resource requests over various resources available in the on-demand service environment. The NFS 2296 may also communicate with the QFS 2292 to update the information stored on the NFS 2296 and/or to provide information to the QFS 2292 for use by servers located within the pod 2244.

In some embodiments, the pod may include one or more database instances 2290. The database instance 2290 may transmit information to the QFS 2292. When information is transmitted to the QFS, it may be available for use by servers within the pod 2244 without requiring an additional database call.

In some embodiments, database information may be transmitted to the indexer 2294. Indexer 2294 may provide an index of information available in the database 2290 and/or QFS 2292. The index information may be provided to file force servers 2276 and/or the QFS 2292.

Figure 23:
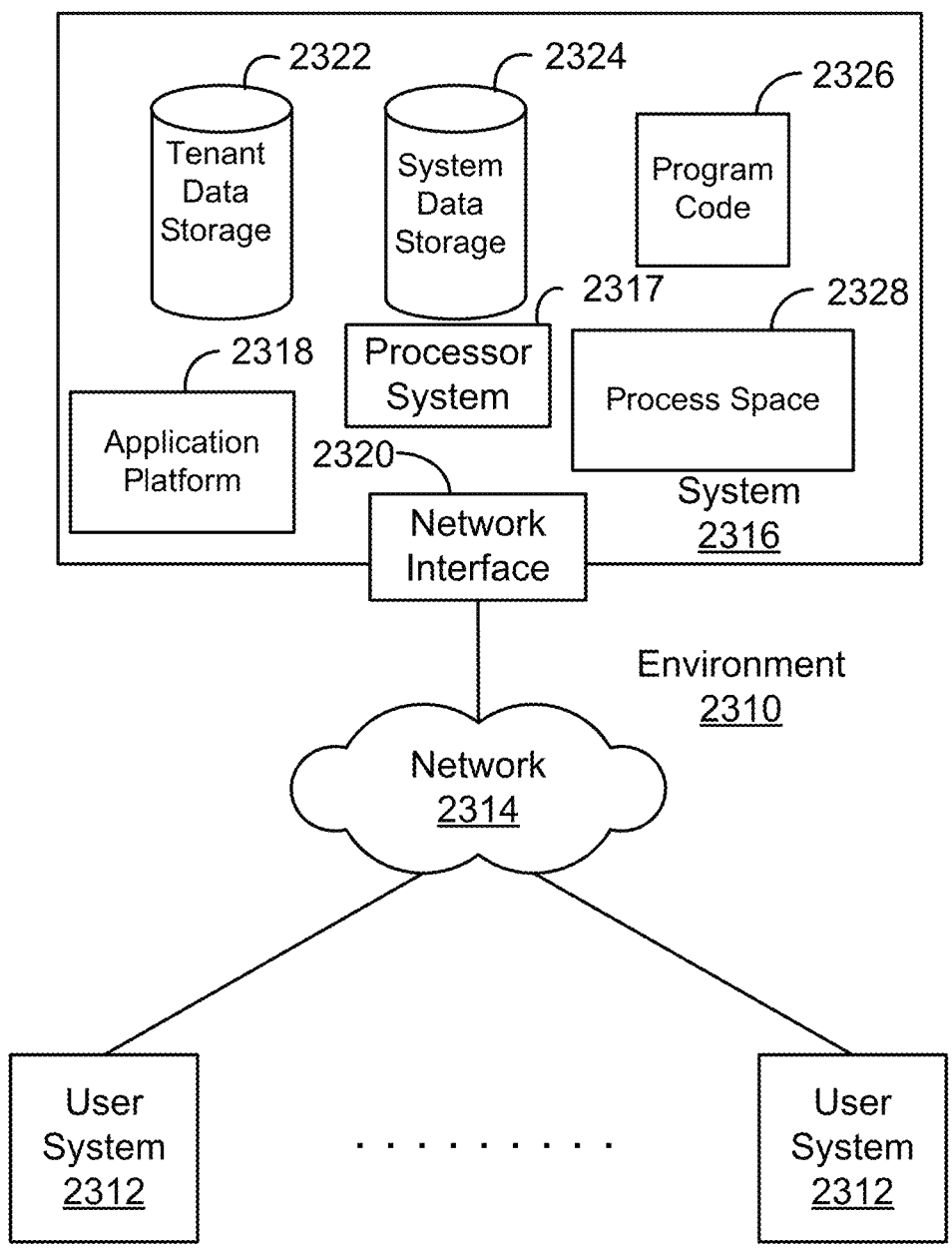
FIG. 23 shows a system diagram 2310 illustrating the architecture of a multitenant database environment, in accordance with some implementations.

FIG. 23 shows a system diagram 2310 illustrating the architecture of a multitenant database environment, in accordance with some implementations.

Figure 24:
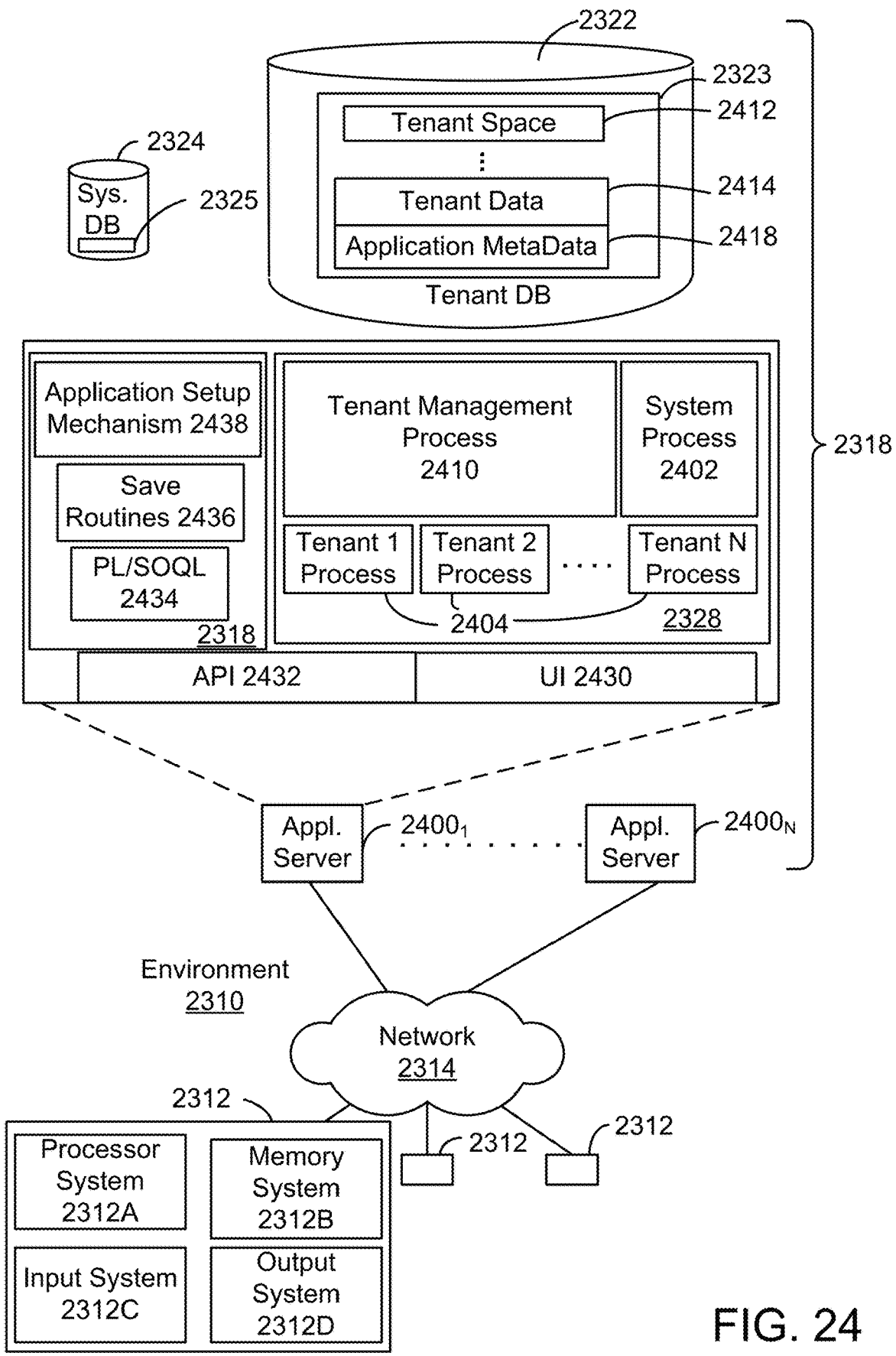
FIG. 24 shows a system diagram 2310 further illustrating the architecture of a multitenant database environment, in accordance with some implementations.

Environment 2310 includes an on-demand database service 2316. User system 2312 may be any machine or system that is used by a user to access a database user system. For example, any of user systems 2312 can be a handheld computing device, a mobile phone, a laptop computer, a work station, and/or a network of computing devices. As illustrated in FIGS. 23 and 24, user systems 2312 might interact via a network 2314 with the on-demand database service 2316.

An on-demand database service, such as system 2316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 2316" and "system 2316" will be used interchangeably herein. A database image may include one or more database objects. A relational database management system (RDBMS) or the equivalent may execute storage and retrieval of information against the database object(s). Application platform 2318 may be a framework that allows the applications of system 2316 to run, such as the hardware and/or software, e.g., the operating system. In an embodiment, on-demand database service 2316 may include an application platform 2318 that enables creation, managing and executing one or more applications developed by the provider of the on-demand database service, users accessing the on-demand database service via user systems 2312, or third party application developers accessing the on-demand database service via user systems 2312.

One arrangement for elements of system 2316 is shown in FIG. 23, including a network interface 2320, application platform 2318, tenant data storage 2322 for tenant data 2323, system data storage 2324 for system data 2325 accessible to system 2316 and possibly multiple tenants, program code 2326 for implementing various functions of system 2316, and a process space 2328 for executing MTS system processes and tenant-specific processes, such as running applications as part of an application hosting service. Additional processes that may execute on system 2316 include database indexing processes.

The users of user systems 2312 may differ in their respective capacities, and the capacity of a particular user system 2312 might be entirely determined by permissions (permission levels) for the current user. For example, where a call center agent is using a particular user system 2312 to interact with system 2316, the user system 2312 has the capacities allotted to that call center agent. However, while an administrator is using that user system to interact with system 2316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 2314 is any network or combination of networks of devices that communicate with one another. For example, network 2314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 2312 might communicate with system 2316 using TCP/IP and, at a higher network level, use other common Internet protocols to communicate, such as HTTP, FTP, AFS, WAP, etc. In an example where HTTP is used, user system 2312 might include an HTTP client commonly referred to as a "browser" for sending and receiving HTTP messages to and from an HTTP server at system 2316. Such an HTTP server might be implemented as the sole network interface between system 2316 and network 2314, but other techniques might be used as well or instead. In some implementations, the interface between system 2316 and network 2314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2316, shown in FIG. 23, implements a web-based customer relationship management (CRM) system. For example, in one embodiment, system 2316 includes application servers configured to implement and execute CRM software applications as well as provide related data, code, forms, web pages and other information to and from user systems 2312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2316 implements applications other than, or in addition to, a CRM application. For example, system 2316 may provide tenant access to multiple hosted (standard and custom) applications. User (or third party developer) applications, which may or may not include CRM, may be supported by the application platform 2318, which manages creation, storage of the applications into one or more database objects and executing of the applications in a virtual machine in the process space of the system 2316.

Each user system 2312 could include a desktop personal computer, workstation, laptop, PDA, cell phone, or any wireless access protocol (WAP) enabled device or any other computing device capable of interfacing directly or indirectly to the Internet or other network connection. User system 2312 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 2312 to access, process and view information, pages and applications available to it from system 2316 over network 2314.

Each user system 2312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 2316 or other systems or servers. For example, the user interface device can be used to access data and applications hosted by system 2316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 2312 and all of its components are operator configurable using applications, such as a browser, including computer code run using a central processing unit such as an Intel Pentium® processor or the like. Similarly, system 2316 (and additional instances of an MTS, where more than one is present) and all of their components might be operator configurable using application(s) including computer code to run using a central processing unit such as processor system 2317, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 2316 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 2316 is configured to provide web pages, forms, applications, data and media content to user (client) systems 2312 to support the access by user systems 2312 as tenants of system 2316. As such, system 2316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 24 shows a system diagram 2310 further illustrating the architecture of a multitenant database environment, in accordance with some implementations. FIG. 24 shows that user system 2312 may include processor system 2312A, memory system 2312B, input system 2312C, and output system 2312D. FIG. 24 shows network 2314 and system 2316. FIG. 24 also shows that system 2316 may include tenant data storage 2322, tenant data 2323, system data storage 2324, system data 2325, User Interface (UI) 2430, Application Program Interface (API) 2432, PL/SOQL 2434, save routines 2436, application setup mechanism 2438, applications servers 24001-2400N, system process space 2402, tenant process spaces 2404, tenant management process space 2410, tenant storage area 2412, user storage 2414, and application metadata 2416. In other embodiments, environment 2310 may not have the same elements as those listed above and/or may have other elements instead of, or in addition to, those listed above.

User system 2312, network 2314, system 2316, tenant data storage 2322, and system data storage 2324 were discussed above in FIG. 23. Regarding user system 2312, processor system 2312A may be any combination of processors. Memory system 2312B may be any combination of one or more memory devices, short term, and/or long term memory. Input system 2312C may be any combination of input devices, such as keyboards, mice, trackballs, scanners, cameras, and/or interfaces to networks. Output system 2312D may be any combination of output devices, such as monitors, printers, and/or interfaces to networks. As shown by FIG. 24, system 2316 may include a network interface 2320 (of FIG. 23) implemented as a set of HTTP application servers 2400, an application platform 2318, tenant data storage 2322, and system data storage 2324. Also shown is system process space 2402, including individual tenant process spaces 2404 and a tenant management process space 2410. Each application server 2400 may be configured to tenant data storage 2322 and the tenant data 2323 therein, and system data storage 2324 and the system data 2325 therein to serve requests of user systems 2312. The tenant data 2323 might be divided into individual tenant storage areas 2412, which can be either a physical arrangement and/or a logical arrangement of data. Within each tenant storage area 2412, user storage 2414 and application metadata 2416 might be similarly allocated for each user. For example, a copy of a user's most recently used (MRU) items might be stored to user storage 2414. Similarly, a copy of MRU items for an entire organization that is a tenant might be stored to tenant storage area 2412. A UI 2430 provides a user interface and an API 2432 provides an application programmer interface to system 2316 resident processes to users and/or developers at user systems 2312. The tenant data and the system data may be stored in various databases, such as Oracle™ databases.

Application platform 2318 includes an application setup mechanism 2438 that supports application developers' creation and management of applications, which may be saved as metadata into tenant data storage 2322 by save routines 2436 for execution by subscribers as tenant process spaces 2404 managed by tenant management process 2410 for example. Invocations to such applications may be coded using PL/SOQL 34 that provides a programming language style interface extension to API 2432. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 2416 for the subscriber making the invocation and executing the metadata as an application in a virtual machine.

Each application server 2400 may be communicably coupled to database systems, e.g., having access to system data 2325 and tenant data 2323, via a different network connection. For example, one application server 24001 might be coupled via the network 2314 (e.g., the Internet), another application server 2400N-1 might be coupled via a direct network link, and another application server 2400N might be coupled by yet a different network connection. Transfer Control Protocol and Internet Protocol (TCP/IP) are typical protocols for communicating between application servers 2400 and the database system. However, other transport protocols may be used to optimize the system depending on the network interconnect used.

In certain embodiments, each application server 2400 is configured to handle requests for any user associated with any organization that is a tenant. Because it is desirable to be able to add and remove application servers from the server pool at any time for any reason, there is preferably no server affinity for a user and/or organization to a specific application server 2400. In one embodiment, therefore, an interface system implementing a load balancing function (e.g., an F5 Big-IP load balancer) is communicably coupled between the application servers 2400 and the user systems 2312 to distribute requests to the application servers 2400. In one embodiment, the load balancer uses a least connections algorithm to route user requests to the application servers 2400. Other examples of load balancing algorithms, such as round robin and observed response time, also can be used. For example, in certain embodiments, three consecutive requests from the same user could hit three different application servers 2400, and three requests from different users could hit the same application server 2400. In this manner, system 2316 is multi-tenant, wherein system 2316 handles storage of, and access to, different objects, data and applications across disparate users and organizations.

As an example of storage, one tenant might be a company that employs a sales force where each call center agent uses system 2316 to manage their sales process. Thus, a user might maintain contact data, leads data, customer follow-up data, performance data, goals and progress data, etc., all applicable to that user's personal sales process (e.g., in tenant data storage 2322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2316 might also maintain system level data usable by multiple tenants or other data. Such system level data might include industry reports, news, postings, and the like that are sharable among tenants.

In certain embodiments, user systems 2312 (which may be client machines/systems) communicate with application servers 2400 to request and update system-level and tenant-level data from system 2316 that may require sending one or more queries to tenant data storage 2322 and/or system data storage 2324. System 2316 (e.g., an application server 2400 in system 2316) automatically generates one or more SQL statements (e.g., SQL queries) that are designed to access the desired information. System data storage 2324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing predefined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an embodiment in which a service cloud console is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A system for providing dynamic customer insights, the system comprising:
a customer data platform implemented using a server system comprising one or more processors in communication with one or more memory devices, the one or more processors configurable to cause:
enabling, for an organization, unification of disparate customer data from a plurality of data sources into a dataset capable of being processed to display a unified view of the customer data; and
performing a data unification process including:
processing an identification of a plurality of source fields of the customer data, including processing a selection of one or more of a plurality of tables and one or more of the source fields to include in the data unification process,
determining which of the source fields to include, exclude, or merge in creating a unified customer profile, determining how to merge source fields, and excluding a designated one or more source fields in creating the unified customer profile as the dataset capable of being processed to display the unified view of the customer data.

2. The system of claim 1, wherein processing the identification of the source fields of the customer data further includes:

determining a type of one or more source fields to describe a purpose of the one or more source fields.

3. The system of claim 1, wherein determining how to merge source fields includes:

identifying a value based on a characteristic specified for participating source fields.

4. The system of claim 1, wherein determining how to merge source fields includes:

identifying a value based on most recency associated with a date or a numeric field for a participating table.

5. The system of claim 1, wherein determining how to merge source fields includes:

identifying a value based on least recency associated with a date or a numeric field for a participating table.

6. The system of claim 1, the one or more processors further configurable to cause:

providing display data configured to be processed to display, in a user interface, the unified view of the customer data.

7. The system of claim 1, wherein determining how to merge source fields includes:

determining to replace existing data based on a characteristic of incoming data versus a characteristic of the existing data.

8. A computer program product associated with a customer data platform, the computer program product comprising a non-transitory computer-readable medium storing computer-readable program code to be executed by at least one processor, the program code comprising instructions configurable to cause:

enabling, for an organization, unification of disparate customer data from a plurality of data sources into a dataset capable of being processed to display a unified view of the customer data; and performing a data unification process including:

processing an identification of a plurality of source fields of the customer data, including processing a selection of one or more of a plurality of tables and one or more of the source fields to include in the data unification process, determining which of the source fields to include, exclude, or merge in creating a unified customer profile, determining how to merge source fields, and excluding a designated one or more source fields in creating the unified customer profile as the dataset capable of being processed to display the unified view of the customer data.

9. The computer program product of claim 8, wherein processing the identification of the source fields of the customer data further includes:

determining a type of one or more source fields to describe a purpose of the one or more source fields.

10. The computer program product of claim 8, wherein determining how to merge source fields includes:

identifying a value based on a characteristic specified for participating source fields.

11. The computer program product of claim 8, wherein determining how to merge source fields includes:

identifying a value based on most recency associated with a date or a numeric field for a participating table.

12. The computer program product of claim 8, wherein determining how to merge source fields includes:

identifying a value based on least recency associated with a date or a numeric field for a participating table.

13. The computer program product of claim 8, the instructions further configurable to cause:

providing display data configured to be processed to display, in a user interface, the unified view of the customer data.

14. The computer program product of claim 8, wherein determining how to merge source fields includes:

determining to replace existing data based on a characteristic of incoming data versus a characteristic of the existing data.

15. A computer-implemented method associated with a customer data platform, the method comprising:

enabling, for an organization, unification of disparate customer data from a plurality of data sources into a dataset capable of being processed to display a unified view of the customer data; and performing a data unification process including:

processing an identification of a plurality of source fields of the customer data, including processing a selection of one or more of a plurality of tables and one or more of the source fields to include in the data unification process, determining which of the source fields to include, exclude, or merge in creating a unified customer profile, determining how to merge source fields, and excluding a designated one or more source fields in creating the unified customer profile as the dataset capable of being processed to display the unified view of the customer data.

16. The computer-implemented method of claim 15, wherein processing the identification of the source fields of the customer data further includes:

determining a type of one or more source fields to describe a purpose of the one or more source fields.

17. The computer-implemented method of claim 15, wherein determining how to merge source fields includes:

identifying a value based on a characteristic specified for participating source fields.

18. The computer-implemented method of claim 15, wherein determining how to merge source fields includes:

identifying a value based on most recency associated with a date or a numeric field for a participating table.

19. The computer-implemented method of claim 15, wherein determining how to merge source fields includes:

identifying a value based on least recency associated with a date or a numeric field for a participating table.

20. The computer-implemented method of claim 15, further comprising:

providing display data configured to be processed to display, in a user interface, the unified view of the customer data.

* * * * *